United States Patent
Ogata et al.

(10) Patent No.: US 10,469,416 B2
(45) Date of Patent: Nov. 5, 2019

(54) INFORMATION PROCESSING DEVICE, INFORMATION PROCESSING METHOD, AND PROGRAM

(71) Applicant: SONY CORPORATION, Tokyo (JP)

(72) Inventors: Takashi Ogata, Tokyo (JP); Hideyuki Ono, Kanagawa (JP); Yasutaka Fukumoto, Tokyo (JP); Masanori Katsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 874 days.

(21) Appl. No.: 14/418,119

(22) PCT Filed: Aug. 1, 2013

(86) PCT No.: PCT/JP2013/070896
§ 371 (c)(1),
(2) Date: Jan. 29, 2015

(87) PCT Pub. No.: WO2014/038323
PCT Pub. Date: Mar. 13, 2014

(65) Prior Publication Data
US 2015/0304252 A1    Oct. 22, 2015

(30) Foreign Application Priority Data

Sep. 6, 2012  (JP) ................................ 2012-195994
Sep. 6, 2012  (JP) ................................ 2012-195995

(51) Int. Cl.
*G06F 15/16*    (2006.01)
*H04L 12/58*    (2006.01)
(Continued)

(52) U.S. Cl.
CPC .......... *H04L 51/046* (2013.01); *H04L 51/043* (2013.01); *H04L 67/28* (2013.01);
(Continued)

(58) Field of Classification Search
CPC ....... H04L 67/306; H04L 67/16; H04L 67/10; H04L 67/0222; H04L 67/25;
(Continued)

(56) References Cited

U.S. PATENT DOCUMENTS 8,676,173 B1 *  3/2014  Crowley ................. H04M 3/42
                                                                455/414.1
2007/0112922 A1    5/2007  Kurata et al.
(Continued)

FOREIGN PATENT DOCUMENTS

CN           1941752 A      4/2007
CN         101924674 A     12/2010
(Continued)

OTHER PUBLICATIONS

David Derbyshire, "We know where you are: Google lets you track friends and family through their mobiles", www.DailyMail.co.uk, Feb. 4, 2009 (Year: 2009).*

(Continued)

*Primary Examiner* — Glenton B Burgess
*Assistant Examiner* — Rachel J Hackenberg
(74) *Attorney, Agent, or Firm* — Xsensus LLP

(57) ABSTRACT

An information processing device including a receiving unit that receives predetermined information from a first information terminal possessed by a first user and a second information terminal possessed by a second user, an action recognition unit that recognizes an action of the first user on the basis of the predetermined information received from the first information terminal, and an information transmitting unit that transmits, on the basis of the recognized action of the first user, information for determining whether or not the second information terminal possessed by the second user is to acquire the predetermined information.

10 Claims, 32 Drawing Sheets

(51) Int. Cl.
  *H04L 29/08* (2006.01)
  *H04W 4/21* (2018.01)
  *H04M 1/2745* (2006.01)
  *H04M 1/725* (2006.01)
  *H04W 4/02* (2018.01)

(52) U.S. Cl.
  CPC .......... *H04W 4/21* (2018.02); *H04M 1/27455* (2013.01); *H04M 1/72519* (2013.01); *H04M 2250/12* (2013.01); *H04W 4/027* (2013.01)

(58) Field of Classification Search
  CPC ..... H04L 12/588; H04L 41/147; H04L 51/32; H04L 51/38; H04L 63/104; H04L 63/08; H04L 65/403; G06F 3/011; G06N 5/02; G06Q 10/00; G06Q 50/01; H04W 4/027; H04W 4/028; H04W 4/043; H04W 4/08; H04W 4/206; H04W 8/18
  See application file for complete search history.

(56) References Cited

U.S. PATENT DOCUMENTS

| | | | | |
|---|---|---|---|---|
| 2009/0047972 | A1* | 2/2009 | Neeraj | G06Q 10/10 455/456.1 |
| 2010/0115426 | A1* | 5/2010 | Liu | G06Q 10/107 715/757 |
| 2010/0315433 | A1 | 12/2010 | Takeshita | |
| 2012/0047448 | A1* | 2/2012 | Amidon | H04W 4/029 715/753 |
| 2012/0100869 | A1* | 4/2012 | Liang | H04W 4/02 455/456.1 |
| 2012/0221639 | A1* | 8/2012 | Mallet | G06Q 50/01 709/204 |
| 2013/0097246 | A1* | 4/2013 | Zifroni | G06Q 50/01 709/204 |
| 2014/0143258 | A1* | 5/2014 | Kao | G06F 17/3089 707/748 |

FOREIGN PATENT DOCUMENTS

| | | |
|---|---|---|
| JP | 2002-259793 A | 9/2002 |
| JP | 2005-234689 A | 9/2005 |
| JP | 2006-345269 A | 12/2006 |
| JP | 2008-234471 A | 10/2008 |
| JP | 2008-311628 A | 12/2008 |
| JP | 2010-134802 A | 6/2010 |
| JP | 2010-287059 A | 12/2010 |
| JP | 2011-81431 A | 4/2011 |

OTHER PUBLICATIONS

Anders Albrechtslund, "Online social networking as participartory surveillance", First Monday, vol. 13, No. 3, Mar. 3, 2008 (Year: 2008).*

Japanese Office Action dated Jun. 13, 2017 in Patent Application No. 2014-534247 (without English Translation).

Combined Chinese Office Action and Search Report dated Jun. 1, 2017 in Patent Application No. 201380043911.6 (with English Translation and English Translation of Category of Cited Documents).

International Search Report dated Aug. 27, 2013 in PCT/JP2013/070896.

Extended European Search Report dated Mar. 23, 2016 in Patent Application No. 13835928.6.

* cited by examiner

FIG. 5

| ACTION RECOGNITION LEVEL | INFORMATION TO SHARE | MAGNITUDE OF POWER CONSUMPTION | RESPONSIVENESS |
|---|---|---|---|
| ACTION RECOGNITION 1 | ANALYZE MOBILE PHONE OPERATION | | ★★★★ |
| ACTION RECOGNITION 2 | ANALYZE OPERATION INFORMATION AND SENSOR INFORMATION INDIVIDUALLY OR IN COMBINATION | ◆ | ★★★ |
| ACTION RECOGNITION 3 | ANALYZE OPERATION INFORMATION, SENSOR INFORMATION, AND POSITION INFORMATION INDIVIDUALLY OR IN COMBINATION | ◆◆◆ | ★ |
| ⋮ | ⋮ | ⋮ | ⋮ |

FIG. 24

| EXAMPLES OF PRESENCE TO SHARE |
| --- |
| BODY INFORMATION<br>　• HEART RATE, BODY TEMPERATURE, MOOD |
| POSITION INFORMATION<br>　• LATITUDE/LONGITUDE, LOCATION ATTRIBUTES |
| ACTION INFORMATION<br>　• ACTION, POSTURE |
| ENVIRONMENT INFORMATION<br>　• WEATHER, AMBIENT SOUND, PICTURE FROM SURVEILLANCE CAMERA |
| AUDIO-VISUAL INFORMATION<br>　• PICTURE FROM WEARABLE CAMERA<br>　• CURRENTLY PLAYING MUSIC (ARTIST/SONG/VOLUME) |
| APPEARANCE INFORMATION<br>　• CLOTHING, HAIRSTYLE, BELONGINGS |
| BUDDY INFORMATION<br>　• PEOPLE USER IS TOGETHER WITH |
| THOUGHT INFORMATION<br>　• DESTINATION, INTENDED ACTION |

FIG. 25

| INDICES FOR DECIDING WHETHER TO SHARE |
| --- |
| GEOGRAPHICAL DISTANCE |
| CORRELATION BETWEEN LOCATION ATTRIBUTES<br>　• SUCH AS BOTH USERS BEING IN SHOPPING LOCATION |
| CORRELATION BETWEEN ACTION PATTERNS<br>　• SUCH AS BOTH USERS RIDING TRAIN |
| REMAINING TIME UNTIL MUTUALLY CONFIGURED EVENT |
| DEGREE OF CLOSENESS<br>　• SUCH AS FREQUENCY OF CONVERSATION |

FIG. 26

| Level | AUDIO-VISUAL INFORMATION |
|---|---|
| Level 1 | SHARE CURRENTLY PLAYING SONG |
| Level 2 | CURRENTLY PLAYING SONG |
| Level 3 | CURRENTLY PLAYING ARTIST |
| Level 4 | ACT OF LISTENING |

FIG. 27

| Level | ACTION INFORMATION |
|---|---|
| Level 1 | EVERYDAY LIFE ACTIONS (SUCH AS SHOPPING) |
| Level 2 | MEANS OF TRANSPORTATION |
| Level 3 | POSTURE INFORMATION |
| Level 4 | DO NOT PROVIDE |

FIG. 28

| Level | POSITION INFORMATION |
|---|---|
| Level 1 | PROVIDE LATITUDE/LONGITUDE |
| Level 2 | PROVIDE LOCATION ATTRIBUTES |
| Level 3 | PROVIDE UP TO PREFECTURE AND CITY/TOWN |
| Level 4 | DO NOT PROVIDE |

FIG. 30

| Level | AUDIO-VISUAL INFORMATION |
|---|---|
| Level 1 | SHARE CURRENTLY PLAYING SONG |
| Level 2 | CURRENTLY PLAYING SONG |
| Level 3 | CURRENTLY PLAYING ARTIST |
| Level 4 | ACT OF LISTENING |

FIG. 31

| Level | ACTION INFORMATION |
|---|---|
| Level 1 | EVERYDAY LIFE ACTIONS (SUCH AS SHOPPING) |
| Level 2 | MEANS OF TRANSPORTATION |
| Level 3 | POSTURE INFORMATION |
| Level 4 | DO NOT PROVIDE |

FIG. 32

| Level | POSITION INFORMATION |
|---|---|
| Level 1 | PROVIDE LATITUDE/LONGITUDE |
| Level 2 | PROVIDE LOCATION ATTRIBUTES |
| Level 3 | PROVIDE UP TO PREFECTURE AND CITY/TOWN |
| Level 4 | DO NOT PROVIDE |

FIG. 34
| Level | SCORE |
|---|---|
| Level 1 | 1.0 - 0.9 |
| Level 2 | 0.8 - 0.5 |
| Level 3 | 0.4 - 0.3 |
| Level 4 | 0.2 - 0.0 |
FIG. 35
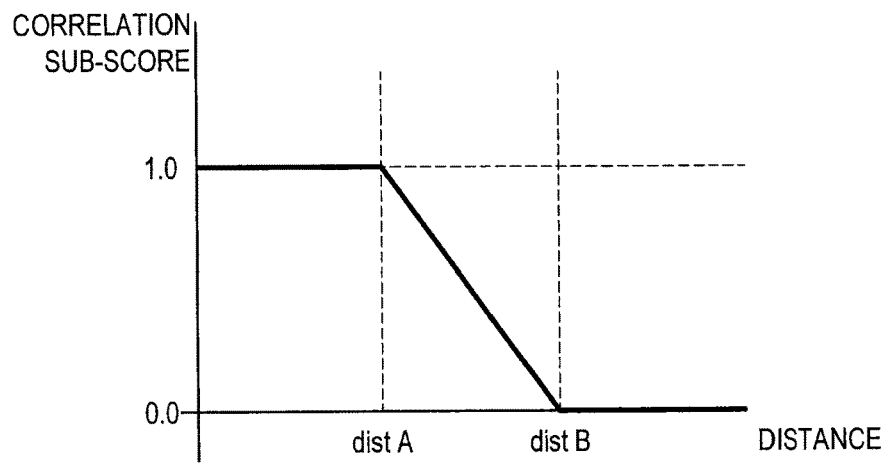
FIG. 36
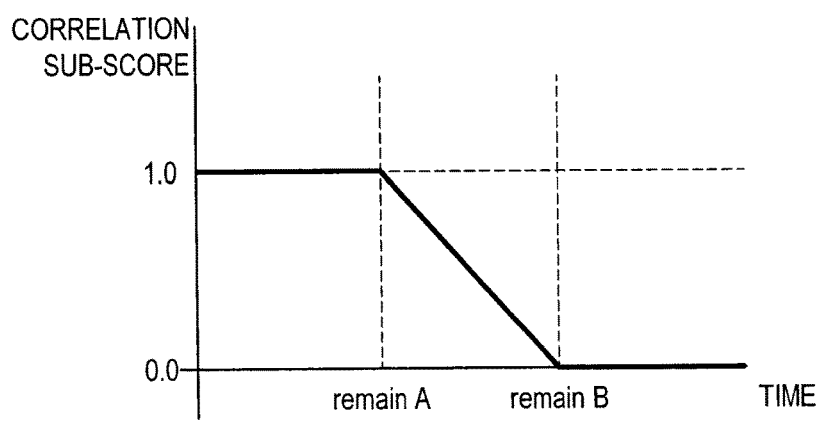

FIG. 37

|  |  | USER Y | | | |
|---|---|---|---|---|---|
|  |  | SHOPPING | WORKING | TRAIN | DINING |
| USER X | SHOPPING | 1.0 | 0.2 | 0.2 | 0.8 |
|  | WORKING | 0.2 | 1.0 | 0.3 | 0.5 |
|  | TRAIN | 0.2 | 0.3 | 1.0 | 0.3 |
|  | DINING | 0.8 | 0.5 | 0.3 | 1.0 |

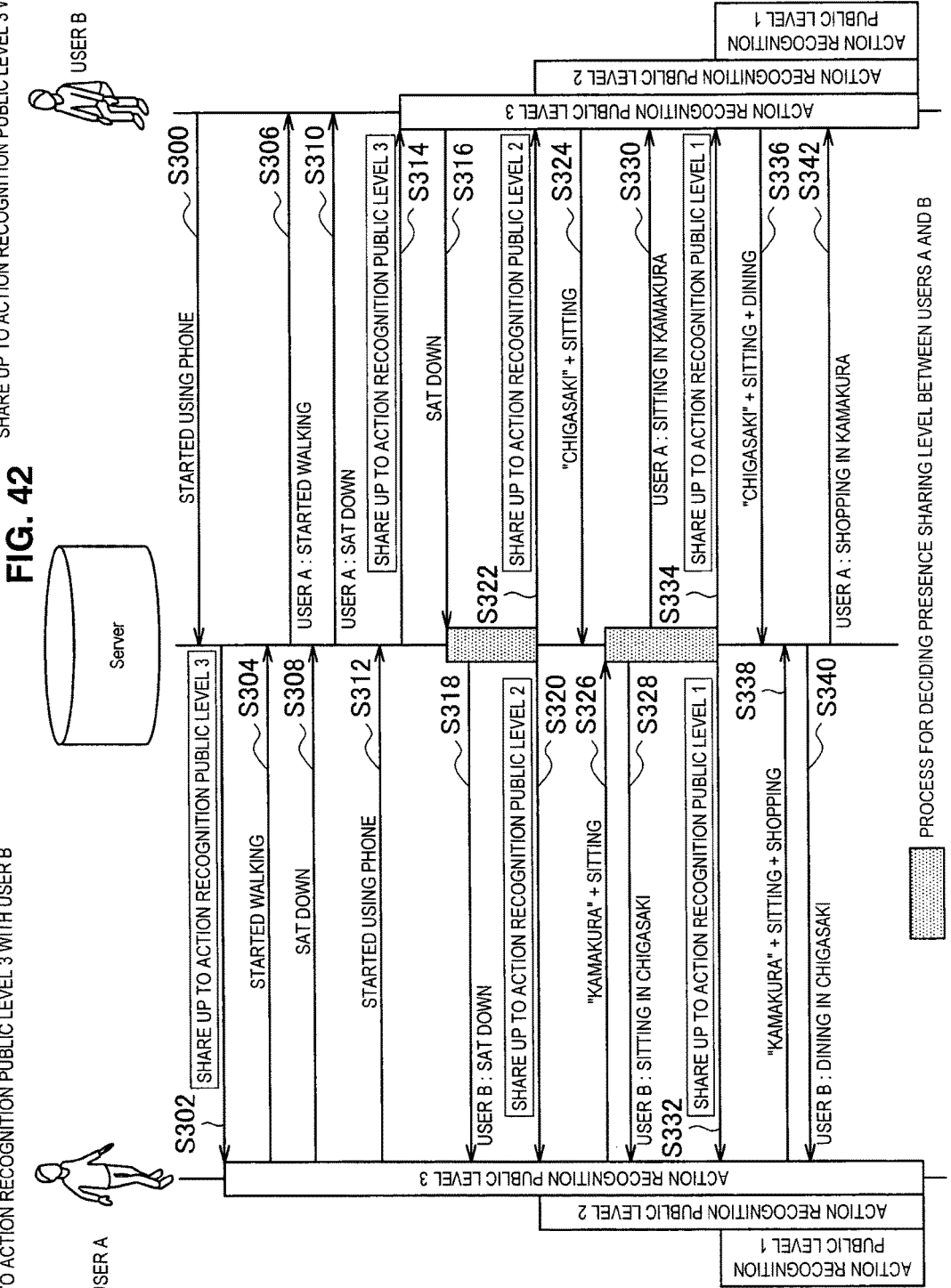

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

In the related art, as described in Patent Literature 1 below, for example, there is known a technology for a device equipped with a communication function and a sensor, such as a mobile phone, in which an action of a user carrying the device is recognized, and the result is shared with friends and the like in real-time.

Also, Patent Literature 2 below describes technology that changes a communication channel according to a degree of closeness with a friend. Also, Patent Literature 3 below describes technology that detects attributes of a location from position information.

CITATION LIST

Patent Literature

Patent Literature 1: JP 2006-345269A
Patent Literature 2: JP2008-311628A
Patent Literature 3: JP2011-81431A

SUMMARY OF INVENTION

Technical Problem

However, in the above technology of the related art, in the case of using a GPS or Wi-Fi function for action recognition, there is a problem in that if the action recognition application is continuously activated, the mobile terminal consumes more power.

Also, in the above technology of the related art, detailed information about a user may be communicated to another user in some cases, and problems such as loss of user privacy and leakage of personal information may potentially occur. Also, in the above technology of the related art, information that is redundant for the recipient of the user information potentially may be provided.

Accordingly, there is demand to reduce power consumption when sharing an action recognition result. Also, there is demand to flexibly configure the level of detail in the presence sharing of a user.

Solution to Problem

According to the present disclosure, there is provided an information processing device including a receiving unit that receives predetermined information from a first information terminal possessed by a first user and a second information terminal possessed by a second user, an action recognition unit that recognizes an action of the first user on the basis of the predetermined information received from the first information terminal, and an information transmitting unit that transmits, on the basis of the recognized action of the first user, information for determining whether or not the second information terminal possessed by the second user is to acquire the predetermined information.

The information processing device may further include an action recognition information transmitting unit that transmits the recognized action of the first user to the second information terminal.

The action recognition information transmitting unit may transmit the action of the first user to another information terminal that belongs to the same predetermined group as the first information terminal.

The action recognition information transmitting unit may transmit information related to a recognized action of one user to an information terminal of another user according to an action recognition level configured for each predetermined group.

The action recognition information transmitting unit may transmit a recognized action of the one user to the second information terminal according to an action recognition level that the first information terminal configures between itself and the second information terminal.

According to the present disclosure, there is provided an information processing system including a client terminal that includes an acceleration sensor that acquires acceleration information, a position information acquisition unit that acquires position information, an operation information acquisition unit that acquires operation information, and an action recognition unit that recognizes an action of a user on the basis of the acceleration information, the position information, or the operation information, and a server that includes a receiving unit that receives action recognition result information recognized by the action recognition unit from the client terminal, and an information transmitting unit that transmits, on the basis of the action recognition result information, information for determining whether or not another client terminal possessed by another user is to acquire the acceleration information or the position information.

According to the present disclosure, there is provided an information processing system including a client terminal that includes an acceleration sensor that acquires acceleration information, a position information acquisition unit that acquires position information, and an operation information acquisition unit that acquires operation information, and a server that includes a receiving unit that receives the acceleration information, the position information, or the operation information from the client terminal, an action recognition unit that recognizes an action of a user who possesses the client terminal on the basis of the acceleration information or the position information, and an information transmitting unit that transmits, on the basis of the recognized action of the user, information for determining whether or not another client terminal possessed by another user is to acquire the acceleration information or the position information.

According to the present disclosure, there is provided a client terminal including an acceleration sensor that acquires acceleration information, a position information acquisition unit that acquires position information, an operation information acquisition unit that acquires operation information, an action recognition unit that recognizes an action of a user on the basis of the acceleration information, the position information, or the operation information, a transmitting unit that transmits action recognition result information recognized by the action recognition unit to a server, and a receiving unit that receives information transmitted by the server on the basis of the action recognition result information received from another client terminal. The client terminal stops operation of the acceleration sensor or the position information acquisition unit on the basis of the information.

According to the present disclosure, there is provided a client terminal including an acceleration sensor that acquires acceleration information, a position information acquisition unit that acquires position information, an operation information acquisition unit that acquires operation information, a transmitting unit that transmits the acceleration information, the position information, or the operation information to a server, and a receiving unit that receives action recognition result information recognized by the server on the basis of the acceleration information or the position information received from another client terminal. The client terminal stops operation of the acceleration sensor or the position information acquisition unit on the basis of the action recognition result information.

According to the present disclosure, there is provided an information processing method including receiving predetermined information from a first information terminal possessed by a first user and a second information terminal possessed by a second user, recognizing an action of the first user on the basis of the predetermined information received from the first information terminal, and transmitting, on the basis of the recognized action of the first user, information for determining whether or not the second information terminal possessed by the second user is to acquire the predetermined information.

According to the present disclosure, there is provided a program causing a computer to function as means for receiving predetermined information from a first information terminal possessed by a first user and a second information terminal possessed by a second user, means for recognizing an action of the first user on the basis of the predetermined information received from the first information terminal, and means for transmitting, on the basis of the recognized action of the first user, information for determining whether or not the second information terminal possessed by the second user is to acquire the predetermined information.

According to the present disclosure, there is provided an information processing device including a receiving unit that receives predetermined information from a first information terminal possessed by a first user and a second information terminal possessed by a second user, an action recognition unit that recognizes actions of the first and the second users on the basis of the predetermined information received from the first or the second information terminal, a correlation score computation unit that computes a correlation score expressing a degree of correlation between the predetermined information received from the first information terminal and the predetermined information received from the second information terminal, a selecting unit that selects, on the basis of the computed correlation score, an action to provide to the first user from among recognized actions of the second user, and a transmitting unit that transmits the selected action of the second user to the first information terminal.

The selecting unit may select a more detailed action as the action to provide to the first user to the extent that the correlation score is high.

The correlation score computation unit may associate related information with each other between a plurality of information received from the first information terminal and information received from the second information terminal, compute, for each combination of related information, a correlation sub-score expressing a degree of correlation between the information, and compute the correlation score on the basis of, for each computed correlation sub-score, the correlation sub-score and a weighting coefficient that expresses a contribution of the sub-score to the correlation score.

Between the plurality of information received from the first information terminal and the information received from the second information terminal, information about a distance between the first and the second information terminals, attributes of locations where the first and the second information terminals are positioned, actions of the first and the second users, or a remaining time until a time that the first and the second users have configured may be associated with each other.

The correlation score computation unit may include a geo-categorizing unit for computing a correlation score by using correlations between geo-category histograms.

The information processing device may further include an action recognition level information transmitting unit that, on the basis of the correlation score, transmits to the first and the second information terminals information indicating a level at which the first and the second information terminals acquire the predetermined information.

The information processing device may further include a transmission frequency decision unit that decides a frequency at which to transmit the action pattern on the basis of the computed correlation score. The transmitting unit may transmit the selected action pattern of the second user to the first information terminal at the computed transmission frequency.

According to the present disclosure, there is provided an information processing system including a first information terminal, possessed by a first user, that includes an acceleration sensor that acquires acceleration information, a position information acquisition unit that acquires position information, an operation information acquisition unit that acquires operation information, and an action recognition unit that recognizes an action of a user on the basis of the acceleration information, the position information, or the operation information, a second information terminal, possessed by a second user, that includes an acceleration sensor that acquires acceleration information, a position information acquisition unit that acquires position information, and an action recognition unit that recognizes an action of a user on the basis of the acceleration information or the position information, and a server that includes a receiving unit that receives action recognition result information recognized by the action recognition unit from each of the first and the second information terminals, a correlation score computation unit that computes a correlation score expressing a degree of correlation between the action recognition result information received from the first information terminal and the action recognition result information received from the second information terminal, a selecting unit that selects, on the basis of the computed correlation score, an action to provide to the first user from among recognized actions of the second user, and a transmitting unit that transmits the selected action of the second user to the first information terminal.

According to the present disclosure, there is provided an information processing system including a first information terminal, possessed by a first user, that includes an acceleration sensor that acquires acceleration information, a position information acquisition unit that acquires position information, and an operation information acquisition unit that acquires operation information, a second information terminal, possessed by a second user, that includes an acceleration sensor that acquires acceleration information, a position information acquisition unit that acquires position information, and an operation information acquisition unit that acquires operation information, and a server that includes a receiving unit that receives the acceleration information, the position information, or the operation information from each of the first and the second information terminals, an action recognition unit that recognizes actions of the first and the second users who possess the first and the second information terminals on the basis of the acceleration information, the position information, or the operation information, a correlation score computation unit that computes a correlation score expressing a degree of correlation between action recognition result information obtained as a result of action recognition of the first user and action recognition result information obtained as a result of action recognition of the second user, a selecting unit that selects, on the basis of the computed correlation score, an action to provide to the first user from among recognized actions of the second user, and a transmitting unit that transmits the selected action of the second user to the first information terminal.

According to the present disclosure, there is provided a client terminal including an acceleration sensor that acquires acceleration information, a position information acquisition unit that acquires position information, an operation information acquisition unit that acquires operation information, an action recognition unit that recognizes an action of a user on the basis of the acceleration information, the position information, or the operation information, a transmitting unit that transmits action recognition result information recognized by the action recognition unit to a server, and a receiving unit that receives an action of another client terminal selected by the server on the basis of a correlation score between the action recognition result information and action recognition result information acquired from the other client terminal.

According to the present disclosure, there is provided a client terminal including an acceleration sensor that acquires acceleration information, a position information acquisition unit that acquires position information, an operation information acquisition unit that acquires operation information, a transmitting unit that transmits the acceleration information, the position information, or the operation information to a server, and a receiving unit that receives an action of another client terminal selected by the server on the basis of a correlation score between an action of a user recognized on the basis of the acceleration information or the position information, and an action of a user of the other client terminal recognized on the basis of the acceleration information or the position information received from the other client terminal.

According to the present disclosure, there is provided an information processing method including receiving predetermined information from a first information terminal possessed by a first user and a second information terminal possessed by a second user, recognizing actions of the first and the second users on the basis of the predetermined information received from the first or the second information terminal, computing a correlation score expressing a degree of correlation between the predetermined information received from the first information terminal and the predetermined information received from the second information terminal, selecting, on the basis of the computed correlation score, an action to provide to the first user from among recognized actions of the second user, and transmitting the selected action of the second user to the first information terminal.

According to the present disclosure, there is provided a program causing a computer to function as means for receiving predetermined information from a first information terminal possessed by a first user and a second information terminal possessed by a second user, means for recognizing actions of the first and the second users on the basis of the predetermined information received from the first or the second information terminal, means for computing a correlation score expressing a degree of correlation between the predetermined information received from the first information terminal and the predetermined information received from the second information terminal, means for selecting, on the basis of the computed correlation score, an action to provide to the first user from among recognized actions of the second user, and means for transmitting the selected action of the second user to the first information terminal.

Advantageous Effects of Invention

According to the present disclosure, it becomes possible to reduce power consumption when sharing an action recognition result. Also, according to the present disclosure, it becomes possible to flexibly configure the level of detail in the presence sharing of a user.

BRIEF DESCRIPTION OF DRAWINGS

FIG. 5 is a schematic diagram illustrating an example of action recognition levels of a user who shares information.

FIG. 24 is a schematic diagram illustrating an example of presence to share.

FIG. 25 is a schematic diagram illustrating indices for deciding whether to share presence.

FIG. 26 is a schematic diagram illustrating presence to share and the sharing level.

FIG. 27 is a schematic diagram illustrating presence to share and the sharing level.

FIG. 28 is a schematic diagram illustrating presence to share and the sharing level.

FIG. 30 is a schematic diagram illustrating the level at which to share the presence of user A.

FIG. 31 is a schematic diagram illustrating the level at which to share the presence of user A.

FIG. 32 is a schematic diagram illustrating the level at which to share the presence of user A.

FIG. 34 is a schematic diagram illustrating sharing levels and scores.

FIG. 35 is a schematic diagram illustrating an example of computing the distance between users, and scoring according to distance.

FIG. 36 is a schematic diagram illustrating an example of scoring according to the remaining time until a configured time.

FIG. 37 is a schematic diagram illustrating correlation of action patterns.

FIG. 42 is a sequence diagram illustrating a process of the example of FIG. 41.

DESCRIPTION OF EMBODIMENTS

Figure 1:
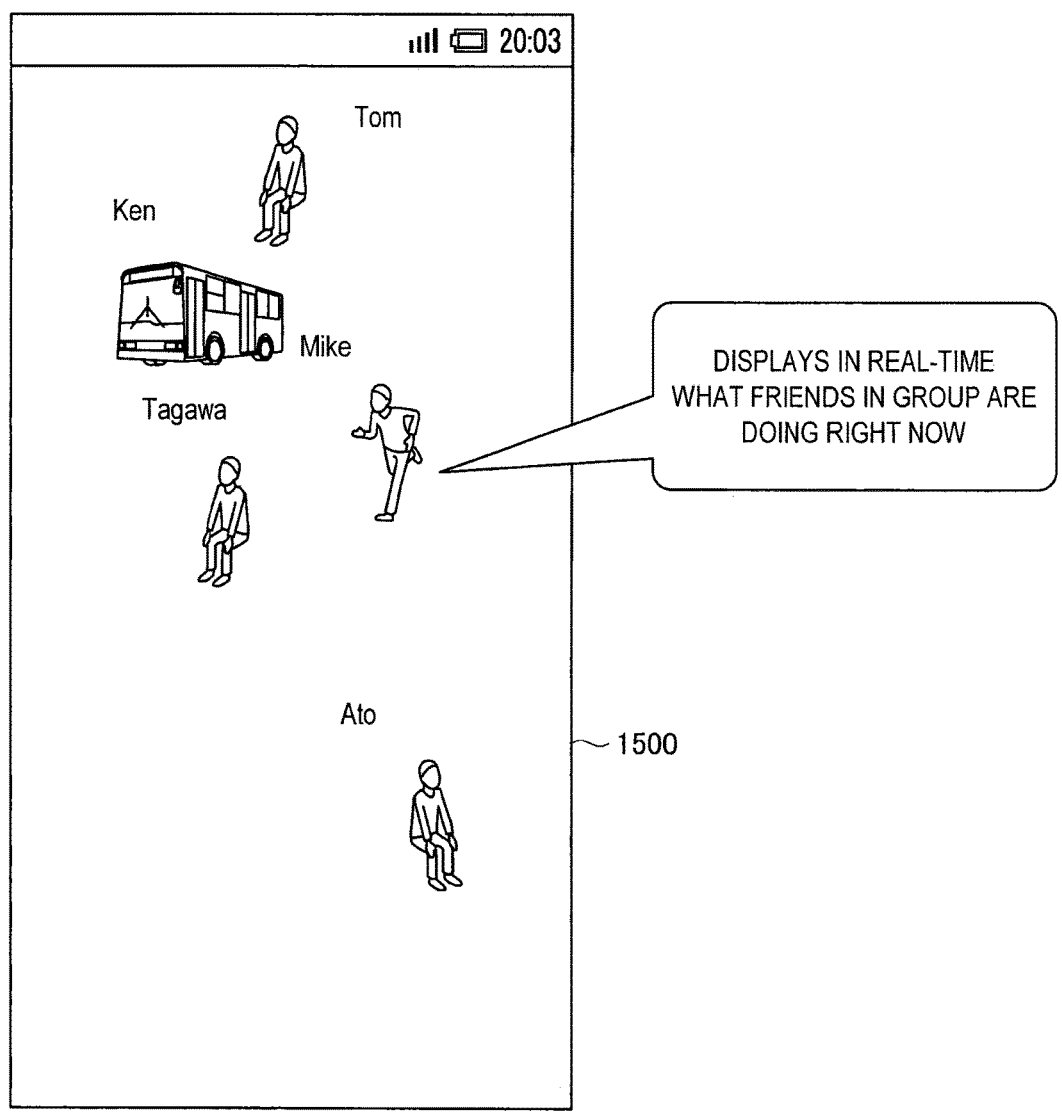
FIG. 1 is a schematic diagram illustrating technology for a device equipped with a communication function and a sensor, such as a mobile phone, in which an action of a user carrying the device is recognized, and the result is shared with friends and the like in real-time.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

1. First Embodiment
1.1. Presupposed technology
1.2. System configuration of first embodiment
1.3. Specific example of system configuration of first embodiment
1.4. Specific example of power consumption reduction
1.5. Example of display transitions in user terminal
1.6. Example of configuring upper limit on action recognition level that a user makes public
1.7. Example of controlling action recognition level according to current conditions of user
1.8. Example of controlling action recognition level according to conditions of terminal in use
1.9. Process flow of first embodiment
2. Second Embodiment
2.1. Presupposed technology
2.2. System configuration of second embodiment
2.3. Presence sharing levels
2.4. Correlation computation according to sub-score
2.5. Process flow of second embodiment
2.6. Example of configuring an upper limit on action recognition level with respect to each recipient user, and linking with presence sharing technology <1. First Embodiment>

[1.1. Presupposed Technology]

First, technology presupposed by the present disclosure will be described with reference to FIG. 1. FIG. 1 is a schematic diagram illustrating technology as described in Patent Literature 1 discussed earlier for a device equipped with a communication function and a sensor, such as a mobile phone (user terminal 1500), in which an action of a user carrying the device is recognized, and the result is shared with friends and the like in real-time. FIG. 1 illustrates a display screen on a user terminal 1500 possessed by each user. In the example illustrated in FIG. 1, each user is able to grasp (share) the actions of each user in real-time, such as a user (Ken) riding a bus, a user (Tagawa) sitting down, and a user (Mike) running.

However, conducting action recognition requires continuously analyzing an acceleration sensor, and since the computations for the analysis are conducted by a central processing unit (CPU) provided in the user terminal 1500, power is consumed. Also, in the case of using position information, power is additionally consumed to acquire position information from services such as GPS and Wi-Fi.

Figure 2:
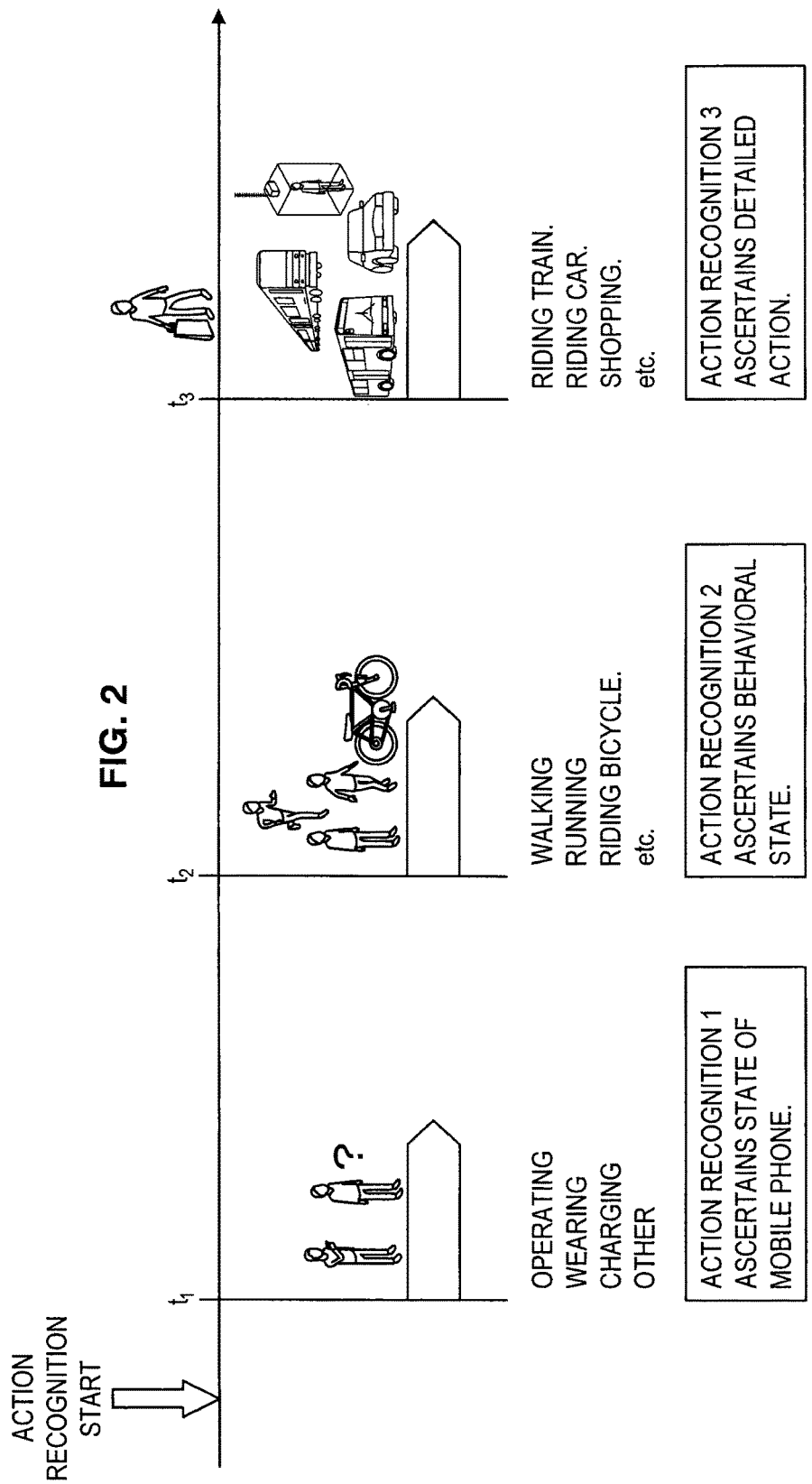
FIG. 2 is a schematic diagram illustrating the response delay of action recognition.

FIG. 2 is a schematic diagram illustrating the response delay of action recognition in the technology illustrated in FIG. 1. In the example illustrated in FIG. 2, t1 seconds after starting action recognition, the status of a mobile phone is acquired by action recognition 1, and is shared among the users belonging to a group. Also, by t2 seconds after starting action recognition, the behavioral status of a user is acquired by action recognition 2, and is shared among the users belonging to the group. Also, by t3 seconds after starting action recognition, the detailed action of a user is acquired by action recognition 3, and is shared among the users belonging to the group. In this way, depending on the type of action, obtaining a recognition result takes time, which becomes a factor exerting psychological stress on the user.

For this reason, in the first embodiment, there is configured a recipient member to whom a recognition result of an action is made public, and a reduction in power consumption is realized by controlling the process of action recognition according to the actions of the member. Also, by presenting a display according to the response performance of action recognition, psychological stress due to user wait time is moderated.

Furthermore, by deciding in advance an upper limit on an action recognition level to publish with respect to each recipient member or each recipient group, the action recognition level is optimally controlled, and power consumption is reduced. Also, the action recognition level to make public is controlled on the basis of the conditions of the user or the status of the terminal in use. Hereinafter, the first embodiment will be described in detail.

[1.2. System Configuration of First Embodiment]

Figure 3:
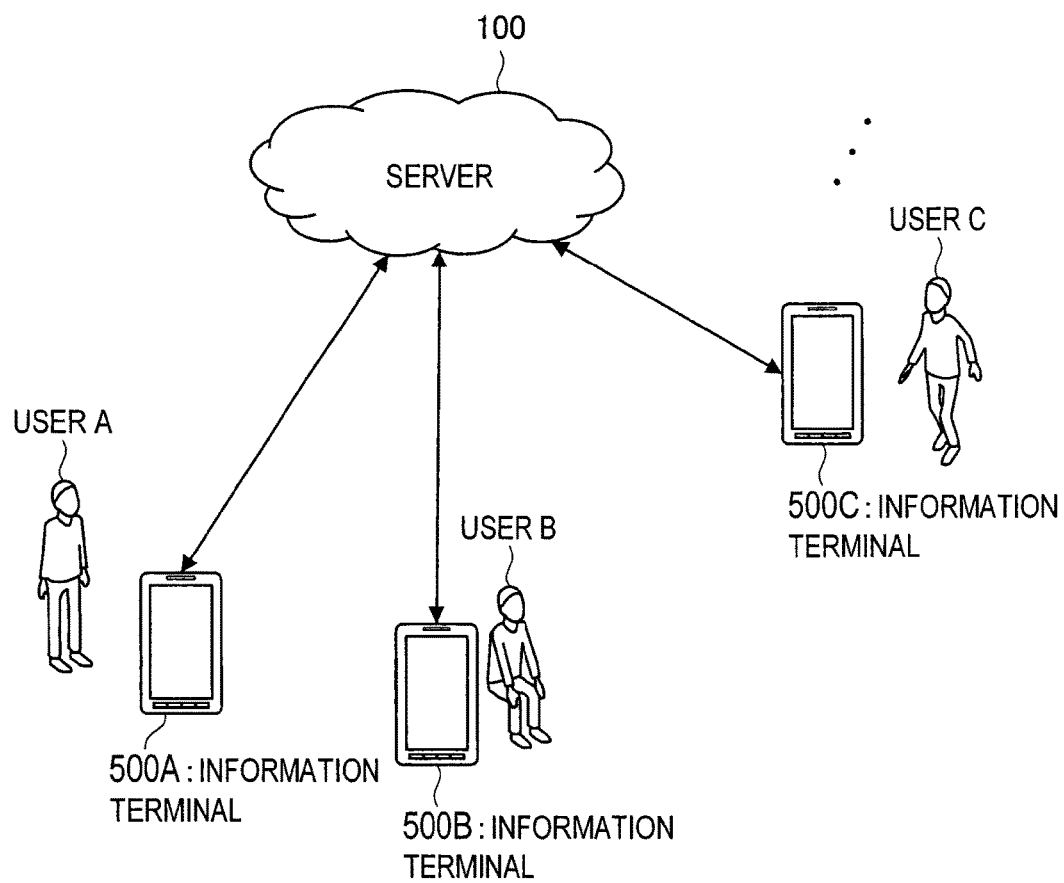
FIG. 3 is a schematic diagram illustrating a system configuration according to the first embodiment.

FIG. 3 is a schematic diagram illustrating a system configuration according to the first embodiment. As illustrated in FIG. 3, the system according to the first embodiment includes a server 100, a user terminal 500A, a user terminal 500B, a user terminal 500C, and so on. The user terminal 500A, the user terminal 500B, the user terminal 500C, and so on are respectively used by a user A, a user B, a user C, and so on.

Figure 4:
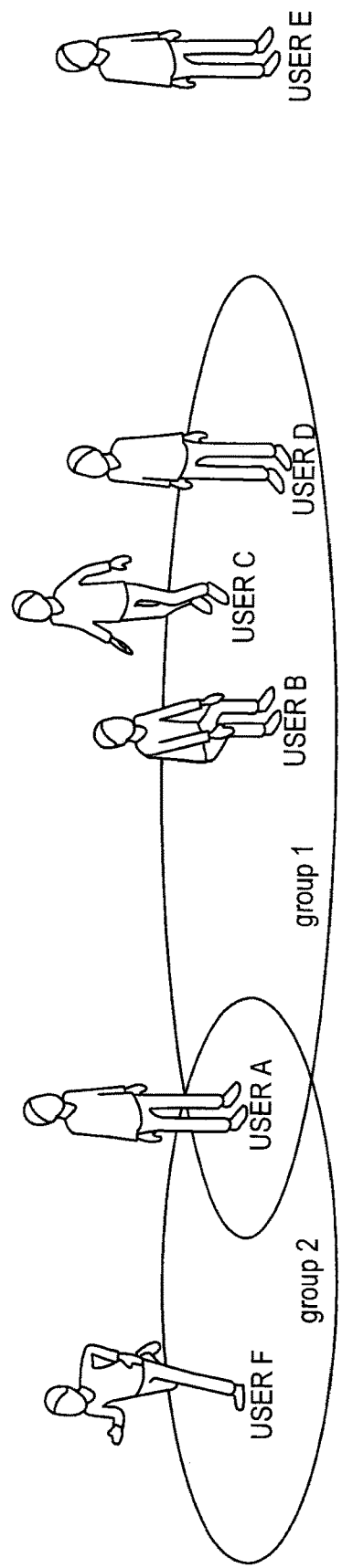
FIG. 4 is a schematic diagram illustrating that four users belonging to a group 1are able to share respective actions on respective user terminals.

Each of the user terminal 500A, the user terminal 500B, the user terminal 500C, and so on configures in the server 100 a recipient group to which its own actions are made public. FIG. 4 illustrates that the users A, B, C, and D each belong to a group to which their own actions are made public (group 1), and these four users are able to share their respective actions on the user terminal 500A, user terminal 500B, user terminal 500C, and user terminal 500D, respectively. FIG. 4 also illustrates that since a user E does not belong to group 1, the user E is unable to share actions with the users A, B, C, and D. Each user may belong to multiple groups at the same time. In FIG. 4, the user A belongs to group 1 and group 2, while a user F belongs to group 2 only.

Note that the device that each user uses for action recognition (user terminal 500A, user terminal 500B, user terminal 500C, and so on) is described herein as a mobile phone (a communication device provided with a display and an onboard sensor), but is not limited thereto. For example, the device used for action recognition may also be a mobile device not provided with a display. Even in this case, the power consumption reduction technology of the present embodiment is still applicable.

Action recognition is mainly conducted by two techniques. The first technique conducts action recognition using an acceleration sensor and a gyro sensor provided in the user terminal 500A, user terminal 500B, user terminal 500C, and so on. Note that this action recognition is sometimes designated low-level action recognition. With the first technique, actions such as a user "walking", "sitting", "standing still", "jumping", "riding a train", "riding a bus", and "riding a car" are recognized. The user terminal 500A, user terminal 500B, user terminal 500C, and so on pre-store output waveforms of the acceleration sensor and the gyro sensor according to behaviors such as a user "walking", "sitting", "standing still", "jumping", "riding a train", "riding a bus", and "riding a car". Subsequently, by comparing waveforms detected with the acceleration sensor and the gyro sensor to the pre-stored output waveforms, the user terminal 500A, user terminal 500B, user terminal 500C, and so on are able to recognize behaviors such as a user "walking", "sitting", "standing still", and "jumping". Note that the output waveforms of the acceleration sensor and the gyro sensor according to behaviors such as a user walking, standing still, and jumping may be stored in the server 100 in advance, and by having the user terminal 500A, user terminal 500B, user terminal 500C, and so on send the detected waveforms of the sensors to the server 100, behaviors such as a user "walking", "sitting", "standing still", and "jumping" may be recognized on the server 100 side. In this way, with the first technique, the user's behavior or other such direct action of the user himself or herself is recognized. Action recognition according to the first technique may use the technique described in JP2010-198595A, for example.

The second technique conducts action recognition using information from an acceleration sensor and a gyro sensor provided in the user terminal 500A, user terminal 500B, user terminal 500C, and so on, and position information. Note that this action recognition is sometimes designated high-level action recognition. With the second technique, actions that are closer to a user's everyday life actions than the first technique are recognized, such as a user "shopping", "riding a vehicle", "dining", and "working". With the second technique, behaviors obtained by the first technique, such as a user "walking", "sitting", "standing still", and "jumping" are combined with the user's position information (latitude and longitude information) obtained from a service such as GPS or Wi-Fi (access point information) to recognize the user's everyday life actions. Also, for the method of acquiring position information, technology that specifies latitude and longitude from base station information on a communication network used by mobile phones is similarly usable. Action recognition according to the second technique may use the technique described in JP2011-81431A, for example.

With the second technique, a user's position information (latitude and longitude information) is acquired on the basis of information obtained from a service such as GPS or Wi-Fi. Subsequently, the user's position information is combined with behaviors obtained by the first technique, such as a user "walking", "sitting", "standing still", and "jumping", to recognize the user's everyday life actions.

Specifically, by combining the user's position information with map database information, the user's action is specified. For example, on the basis of the user's position information, the user is specified to be positioned in a "restaurant" location, and in the case of determining that the user is sitting according to the first technique, the user is recognized to be "dining at a restaurant". In this case, if the time is 12:00 noon, the user is recognized to be "having lunch at a restaurant". Also, if the user is positioned in an office center and determined to be "sitting" according to the first technique, for example, the user is recognized to be "working at the office".

Instead of a map database, a database may also be generated on the basis of feedback from the user. For example, if the user is positioned in an office center, by having the user provide feedback indicating that the user is in an office center in addition to position information, the correspondence of the position information with an office center is recorded. By building a database from such recorded information, it is possible to identify attributes of a location where the user is present (such as an office or restaurant) on the basis of the position information acquired by the user.

As above, for action recognition, a user's behaviors may be recognized by the first technique, and a user's everyday life actions may be recognized by the second technique.

FIG. 5 is a schematic diagram illustrating an example of action recognition levels of a user who shares information. As illustrated in FIG. 5, the information to share differs according to action recognition levels 1 to 3. In action recognition level 1, operation information of the user terminal 500A, user terminal 500B, user terminal 500C, and so on is analyzed and shared with users belonging to the same group. In action recognition level 2, in addition to the operation information of level 1, sensor information obtained from the acceleration sensor and gyro sensor is analyzed and shared with users belonging to the same group. The operation information and the sensor information may be analyzed independently or in combination. In action recognition level 3, in addition to the operation information of level 1 and the sensor information of level 2, position information obtained from GPS or Wi-Fi is analyzed and shared with users. The operation information, the sensor information, and the position information may be analyzed independently or in combination. As illustrated in FIG. 5, as the action recognition level rises, the conditions of the user may be known in more detail, but the power consumption for analysis increases, and in addition, the response of the result output also becomes slower. Note that, as discussed earlier, actions such as a user "started walking" and "stopped" are recognized from the sensor information according to the first technique. Also, by combining the sensor information and the position information, actions such as a user "working" and "dining" are recognized according to the second technique. Note that although FIG. 5 illustrates an example of dividing the action recognition levels into three stages, the number of divisions of the action recognition levels is not limited thereto.

Figure 6:
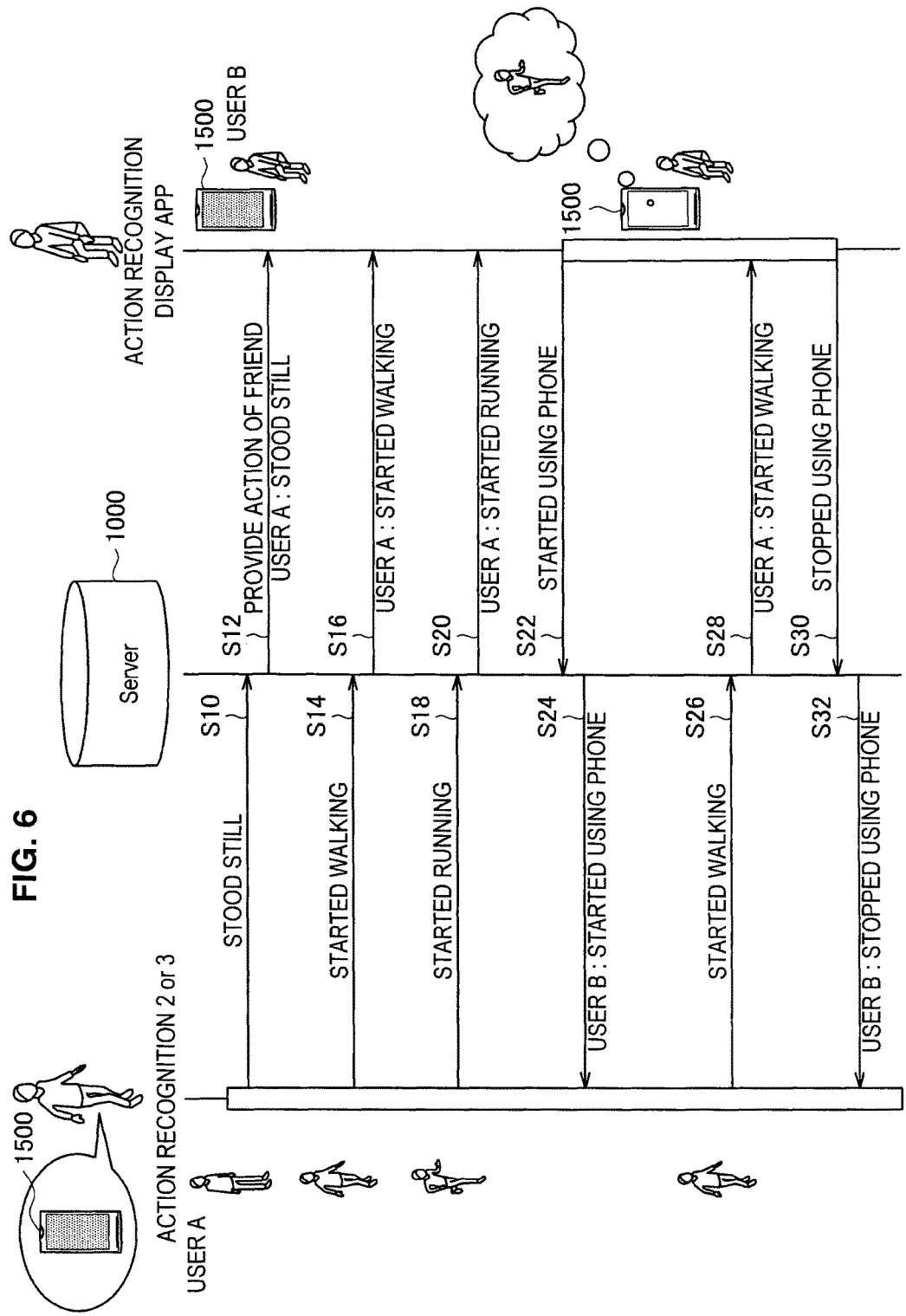
FIG. 6 is a schematic diagram illustrating a mechanism of displaying a user's actions.

FIG. 6 is a schematic diagram illustrating a mechanism of displaying the actions of users with the presupposed technology illustrated in FIG. 1. Suppose that user A and user B belong to group 1, and all users in group 1 are conducting action recognition level 1. In other words, the user terminals 1500 of all users in group 1 are sharing the results of analyzing the operation of each user terminal 1500.

After that, the processing from step S10 is sequentially conducted, and action recognition at action recognition level 2 and action recognition level 3 is conducted. Consequently, the "stopped", "started walking", and "started running" actions of user A, and the "starting using phone", "stopped using phone" actions of user B are recognized by the server, and shared with all users in group 1.

[1.3. Specific Example of System Configuration of First Embodiment]

Figure 7:
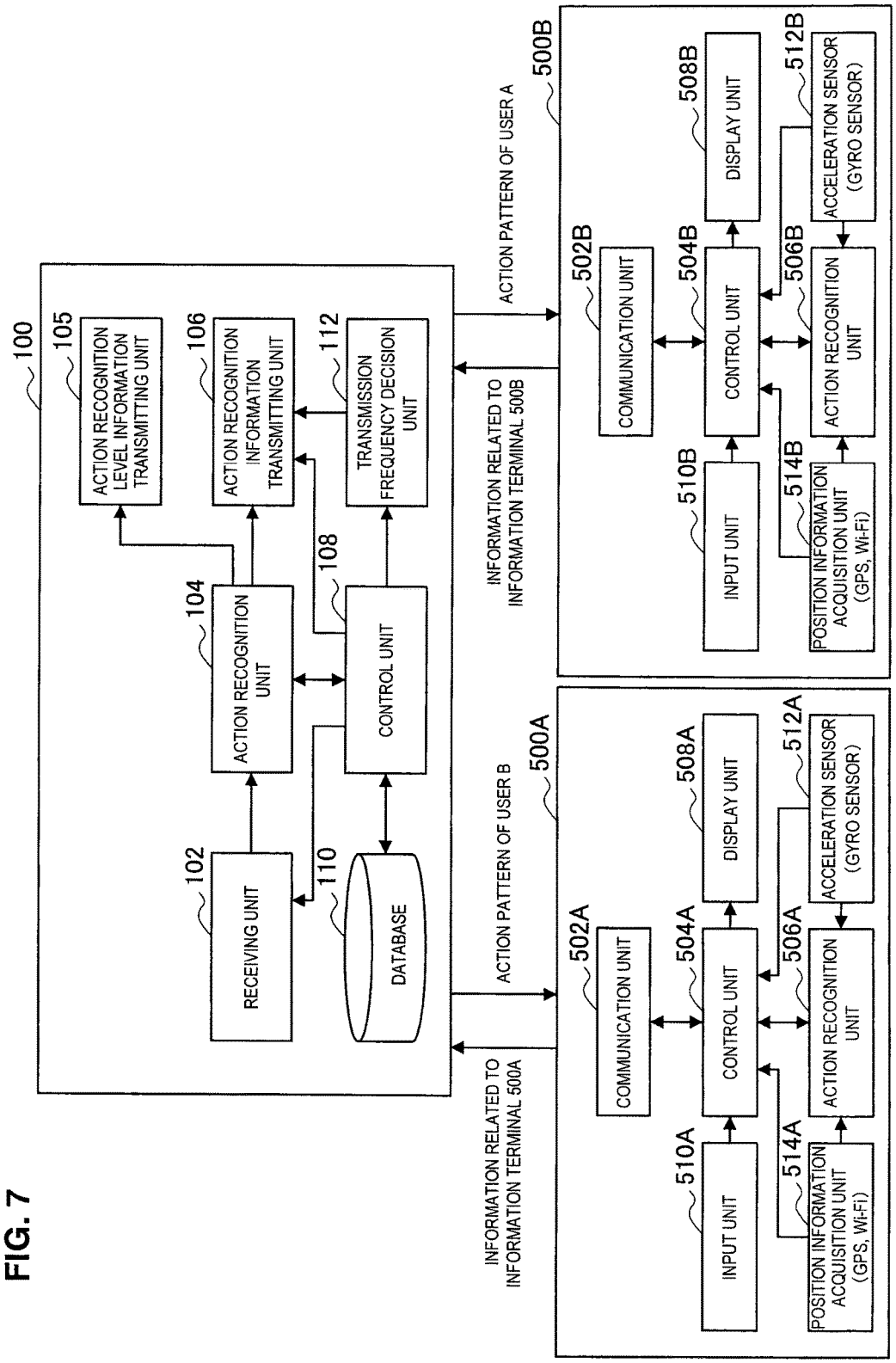
FIG. 7 is a schematic diagram illustrating a configuration of a server and user terminals according to the first embodiment.

FIG. 7 is a schematic diagram illustrating a configuration of the server 100 and the user terminals 500A and 500B according to the first embodiment. As illustrated in FIG. 7, the server 100 includes a receiving unit 102, an action recognition unit 104, an action recognition level information transmitting unit 105, an action recognition information transmitting unit 106, a control unit 108, a database 110, and a transmission frequency decision unit 112. Also, the user terminal 500A includes a communication unit 502A, a control unit 504A, an action recognition unit 506A, a display unit 508A, an input unit 510A, an acceleration sensor 512A, and a position information acquisition unit 514A using GPS or the like, while the user terminal 500B includes a communication unit 502B, a control unit 504B, a action recognition unit 506B, a display unit 508B, an input unit 510B, an acceleration sensor 512B, and a position information acquisition unit 514B using GPS or the like.

The communication unit 502A of the user terminal 500A transmits information related to the user terminal 500A obtained from the input unit 510A, the acceleration sensor 512A, and the position information acquisition unit 514A (such as operation information, sensor information, and position information) to the server 100. Additionally, the communication unit 502A may also transmit an action recognition result obtained by the action recognition unit 506A to the server 100. The action recognition unit 506A recognizes an action using the first technique or second technique discussed earlier on the basis of information related to the user terminal 500A obtained from the input unit 510A, the acceleration sensor 512A, and the position information acquisition unit 514A (such as operation information, sensor information, and position information). Also, the communication unit 502A of the user terminal 500A receives an action pattern (action recognition result information) of the user B from the server 100. Similarly, the communication unit 502B of the user terminal 500B transmits information related to the user terminal 500B obtained from the input unit 510B, the acceleration sensor 512B, and the position information acquisition unit 514B (such as operation information, sensor information, and position information) to the server 100. Additionally, the communication unit 502B may also transmit an action recognition result obtained by the action recognition unit 506B to the server 100. The action recognition unit 506B recognizes an action using the first technique or second technique discussed earlier on the basis of information related to the user terminal 500B obtained from the input unit 510B, the acceleration sensor 512B, and the position information acquisition unit 514B (such as operation information, sensor information, and position information). Also, the communication unit 502B of the user terminal 500B receives an action pattern (action recognition result information) of the user A from the server 100.

The receiving unit 102 of the server 100 receives information such as operation information, sensor information, and position information from the user terminals 500A and 500B. Also, the receiving unit 102 of the server 100 receives an action recognition result when the user terminal 500A or 500B transmits an action recognition result obtained by the action recognition unit 506A or 506B. The action recognition unit 104 recognizes a user's action on the basis of information such as operation information, sensor information, and position information sent from the user terminal 500A or 500B. At this point, the action recognition unit 104 recognizes an action using the first technique or the second technique discussed earlier. Also, when the user terminal 500A or 500B transmits an action recognition result obtained by the action recognition unit 506A or 506B, the action recognition unit 104 recognizes a user's action according to the received action recognition result. The action recognition information transmitting unit 106 transmits a recognized user action to each of the user terminals 500A and 500B. Consequently, the user terminals 500A and 500B are each able to recognize the actions of each user. When the action recognition unit 104 recognizes that an operation of a user terminal has started, the action recognition level information transmitting unit 105 specifies the action recognition level discussed later so as to raise the action recognition level to "2" or higher, and transmits action recognition level information to each of the user terminals 500A and 500B. The control unit 108 is made up of components such as a central processing unit (CPU), and controls the server 100 overall. The database 110 is a storage unit that stores data, and stores information such as the action recognition level discussed later, and the groups to which each user belongs. The transmission frequency decision unit 112 decides a transmission frequency at which the action recognition information transmitting unit 106 transmits recognized user actions.

The action recognition unit 506A of the user terminal 500A recognizes an action of the user possessing the user terminal 500A on the basis of information related to the user terminal 500A obtained from the input unit 510A, the acceleration sensor 512A, and the position information acquisition unit 514A (such as operation information, sensor information, and position information). Similarly, the action recognition unit 506B of the user terminal 500B recognizes an action of the user possessing the user terminal 500B on the basis of information related to the user terminal 500B obtained from the input unit 510B, the acceleration sensor 512B, and the position information acquisition unit 514B (such as operation information, sensor information, and position information). The action recognition units 500A and 500B change the action recognition level for the information to acquire on the basis of a command from the control unit 504A and control unit 504B, respectively. Also, the action recognition units 506A and 506B acquire user-related information on the basis of information input into the input units 510A and 510B.

The display units 508A and 508B of the user terminals 500A and 500B are made up of a liquid crystal display (LCD) or the like, and display information related to the actions of other users on the basis of instructions from the control units 504A and 504B. Also, the input units 510A and 510B are made up of components such as a touch sensor and a keyboard, and function as an interface into which user operations are input.

The control units 504A and 504B are made up of components such as a central processing unit (CPU), and control the user terminals 500A and 500B overall. The control units 504A and 504B include a clock that acquires time information.

As above, the server 100 may conduct action recognition for each user with the action recognition unit 104 on the basis of information acquired from the user terminals 500A and 500B (such as operation information, sensor information, and position information). Additionally, the user terminals 500A and 500B may conduct action recognition with the action recognition units 506A and 506B, respectively. In the case of the server 100 conducting action recognition on the basis of information acquired from the user terminals 500A and 500B (such as operation information, sensor information, and position information), the processing load on the user terminals 500A and 500B may be further reduced.

Note that each structural element of the server 100 illustrated in FIG. 7 may be configured by a circuit (hardware), or by the control unit 108 and a program (software) causing the control unit 108 to function. In this case, the program may be stored in a storage unit (the database 110) provided in the server 100.

Similarly, each structural element of the user terminals 500A and 500B illustrated in FIG. 7 may be configured by a circuit (hardware), or by the control unit 504A or 504B and a program (software) causing the control unit 504A or 504B to function. In this case, the program may be stored in a storage unit (not illustrated) such as memory provided in the user terminals 500A and 500B.

[1.4. Specific Example of Power Consumption Reduction]

In FIG. 6, in a state in which all users in the group are not looking at the display app of the user terminals 500A, 500B, and so on, the sharing among the users of information from action recognition 2 starting from step S10 may be stopped without creating inconvenience.

Figure 8:
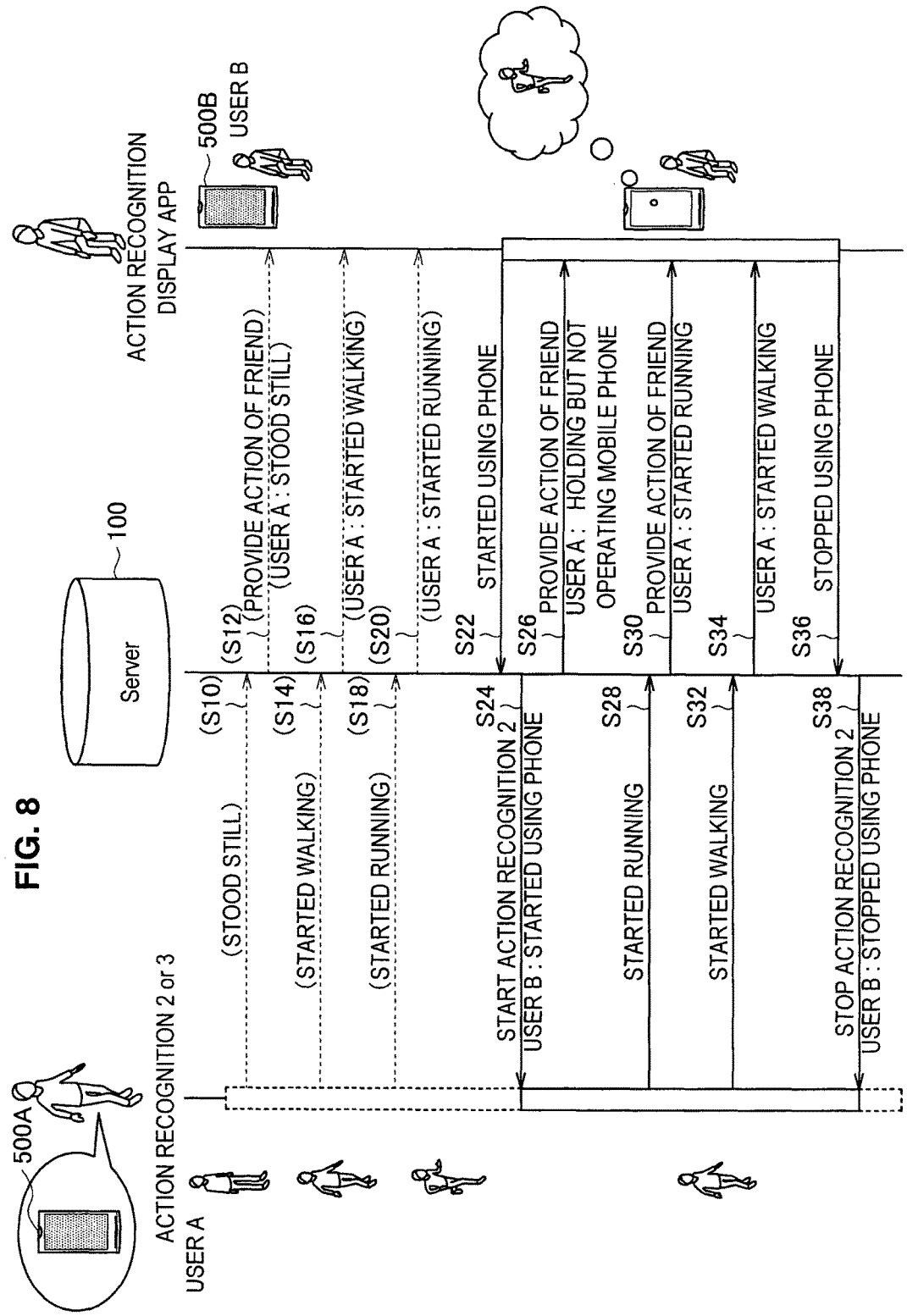
FIG. 8 is a schematic diagram illustrating an example of stopping a process from step S10 in a state in which all users in a group are not operating a user terminal.

For this reason, in the present embodiment, as illustrated in FIG. 8, the processing from step S10 is stopped in a state in which all users in a group that the users are participating in are not operating the user terminals 500A and 500B. Consequently, action recognition according to action recognition levels 2 and 3 is not conducted. Subsequently, if one person in the group operates the user terminal 500A or 500B, the processing of action recognition level 2 or higher is conducted. In the example illustrated in FIG. 8, in step S22, the transmission of the action of the user B "started operating mobile phone" to the server 100 triggers the starting of the processing of action recognition level 2 or higher (steps S22 to S38) by the user terminals 500A, 500B, and so on that belong to the group. Subsequently, in step S38, the transmission of the action of the user A "stopped operating mobile phone" to the server 1000 triggers the stopping of the processing of action recognition level 2 or higher. Consequently, it becomes possible to limit the time when the processing of action recognition level 2 or higher is conducted, and a major reduction in power consumption becomes possible.

In step S22, the input unit 510B of the user terminal 500B receives a user operation and notifies the control unit 504B that the operation was received, and the control unit 504B causes a notification that a user operation was received to be transmitted from the communication unit 502B to the server 100.

In step S24, the server 100 transmits information indicating that "user B started using phone" together with a notification to "start action recognition at action recognition level 2 or higher" to the user terminal 500A. Subsequently, the communication unit 502A of the user terminal 500A receives the notification to "start action recognition at action recognition level 2 or higher" from the server 100. After receiving this notification, the control unit 504A of the user terminal 500A raises the level of action recognition by the action recognition unit 506A to "action recognition level 2". Consequently, in step S28 and step S32, information indicating that the user A "started running" and "started walking" is acquired by the action recognition unit 506A, and in steps S30 and S34, is transmitted to the user terminal 500B.

In step S36, on the basis of the operation information input into the input unit 510B, the control unit 504B senses that the user B has stopped using the user terminal 500B, and the stop in the use of the user terminal 500B is transmitted from the transmitting unit 500A to the server 100. The server 100 transmits information indicating that the user B has stopped using the user terminal 500B to the user terminal 500A. Also, since the use of the user terminal 500B has ended, the server 100 transmits an instruction to "stop action recognition level 2" to the user terminal 500A (step S38). The control unit 504A of the user terminal 500A receives the instruction to "stop action recognition", and stops action recognition by the action recognition unit 506A. Consequently, the acquisition of user information is stopped, and it becomes possible to reduce power consumption.

[1.5. Example of Display Transitions in User Terminal]

Figure 9:
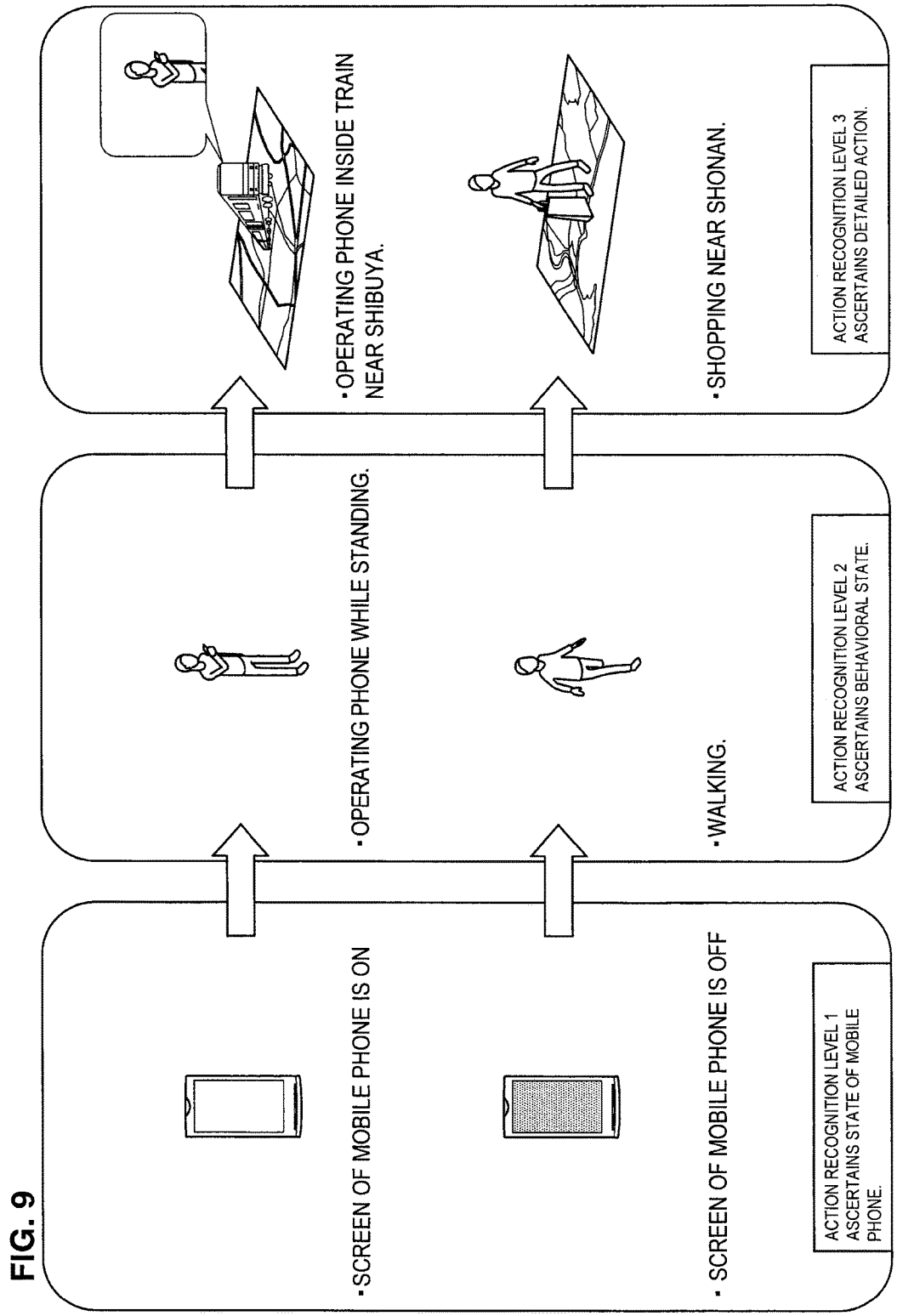
FIG. 9 is a schematic diagram illustrating an example of a display of a user terminal transitioning according to the level of action recognition.

FIG. 9 is a schematic diagram illustrating an example of the display of the user terminals 500A, 500B, and so on transitioning according to the level of action recognition. As illustrated in FIG. 9, by causing the display state to transition according to the level of action recognition, a user is able to instantaneously recognize the level of action recognition. As illustrated in FIG. 9, at action recognition level 1, the outward appearance of another user terminal 500A, 500B, and so on is displayed on the respective display units 506A of the user terminals 500A, 500B, and so on, and the on/off state of the user terminal 500A, 500B, and so on of each user is expressed by the color or brightness of the outward appearance. At action recognition level 2, the behavioral state of each user of another user terminal 500A, 500B, and so on is expressed on the respective display units 506A of the user terminals 500A, 500B, and so on by the display of the outward appearance of a person. At action recognition level 2, the detailed action of another user is expressed on the respective display units 506A of the user terminals 500A, 500B, and so on by the display of a person, a map, a means of transportation, and the like.

In addition, in the exemplary display illustrated in FIG. 9, by obtaining recognition results of action recognition and sharing the recognition results starting from those which may be shared, psychological stress on the user may be lowered.

Figure 10:
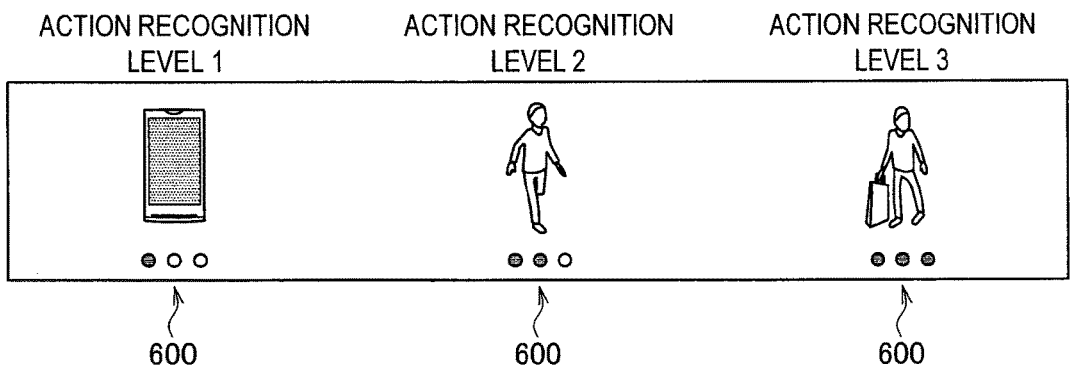
FIG. 10 is a schematic diagram illustrating a status indicator of display transitions.
Figure 11:
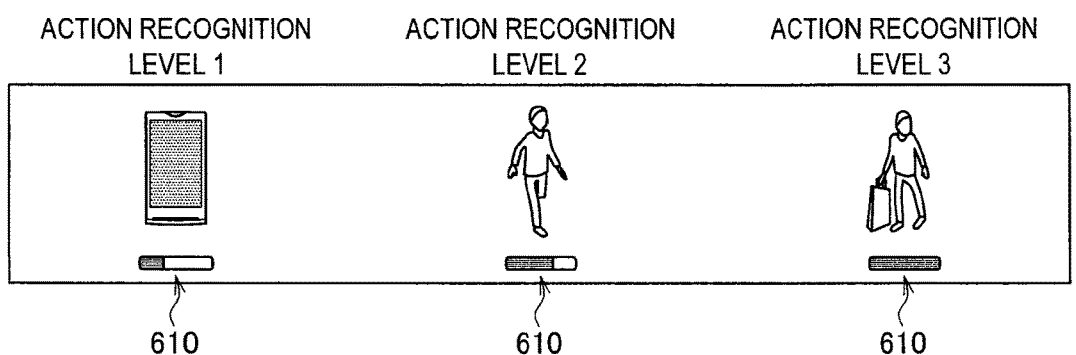
FIG. 11 is a schematic diagram illustrating a status indicator of display transitions.
Figure 12:
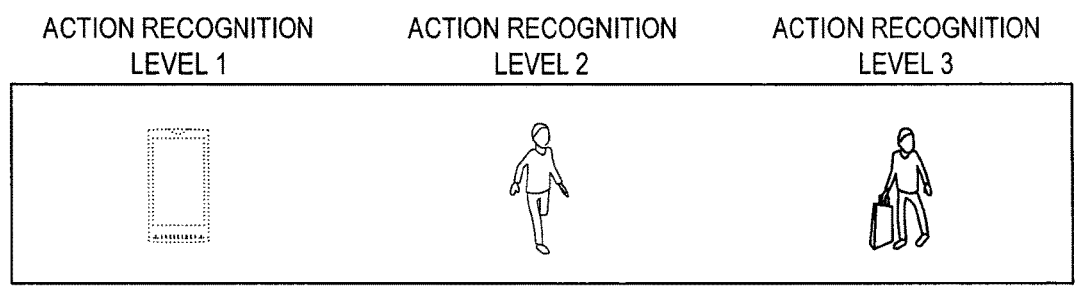
FIG. 12 is a schematic diagram illustrating a status indicator of display transitions.

FIGS. 10 to 12 are schematic diagrams illustrating status indicators of display transitions. Although the display transitions between the action recognition levels 1 to 3 every time the action analysis results are updated, in the examples illustrated in FIGS. 10 to 12, there is presented a display that indicates how much the display has been updated, and whether there is a possibility of the display being updated further. FIG. 10 illustrates an example that indicates the current action analysis results in units of transition states, and illustrates an example in which the leftmost dot among the three dots 600 lights up in the case of action recognition 1, the leftmost two dots among the three dots 600 light up in the case of action recognition 2, and all three dots 600 light up in the case of action recognition level 3. Consequently, the user is able to recognize which level is the current action recognition level.

FIG. 11 illustrates an example of displaying the remaining time until switching to the next state at each level of the action recognition levels 1 to 3. In this case, an indicator 610 moves to the right as time elapses, indicating that the remaining time until switching to the next state is decreasing.

FIG. 12 is a schematic diagram illustrating an example of changing the display of an image, such as the transparency or chroma of an image to display. In this case, the transparency of the image rises as the level falls from action recognition 3, to action recognition 2, to action recognition 1. Consequently, the user is able to instantaneously recognize the current level.

In the examples of FIGS. 10 to 12, the user terminals 500A, 500B, and so on receive an action recognition level from the server 100, and on the basis of a command from the control units 504A, 504B, and so on, cause the display units 508A, 508B, and so on to present a display according to the action recognition level.

[1.6. Example of Configuring Upper Limit on Action Recognition Level that a User Makes Public]

Next, an example of configuring upper limit on the action recognition level that a user makes public will be described. By configuring an upper limit on the action recognition level that a user makes public, unwanted action recognition may be avoided, and power consumption may be reduced more efficiently.

The following methods (A) and (B) are given as examples of specific methods.

(A) Method of configuring upper limit with respect to recipient group (B) Method of configuring upper limit with respect to each recipient user Also, if the "method of dynamically changing the presence sharing level" described in the second embodiment is applied, it is possible to change the action recognition level progressively from the conditions of the recipient peer obtained from action recognition, rather than immediately conducting the action recognition level at the upper limit configured with (B). Such an example will be described in the second embodiment.

It is also possible to carry out (A) and (B) at the same time. For example, the maximum upper limit configured by everyone with (B) may be treated as the upper limit (A) for the group. Alternatively, if (B) is configured to exceed the upper limit configured with (A), the upper limit (A) for the group may be prioritized.

Figure 13:
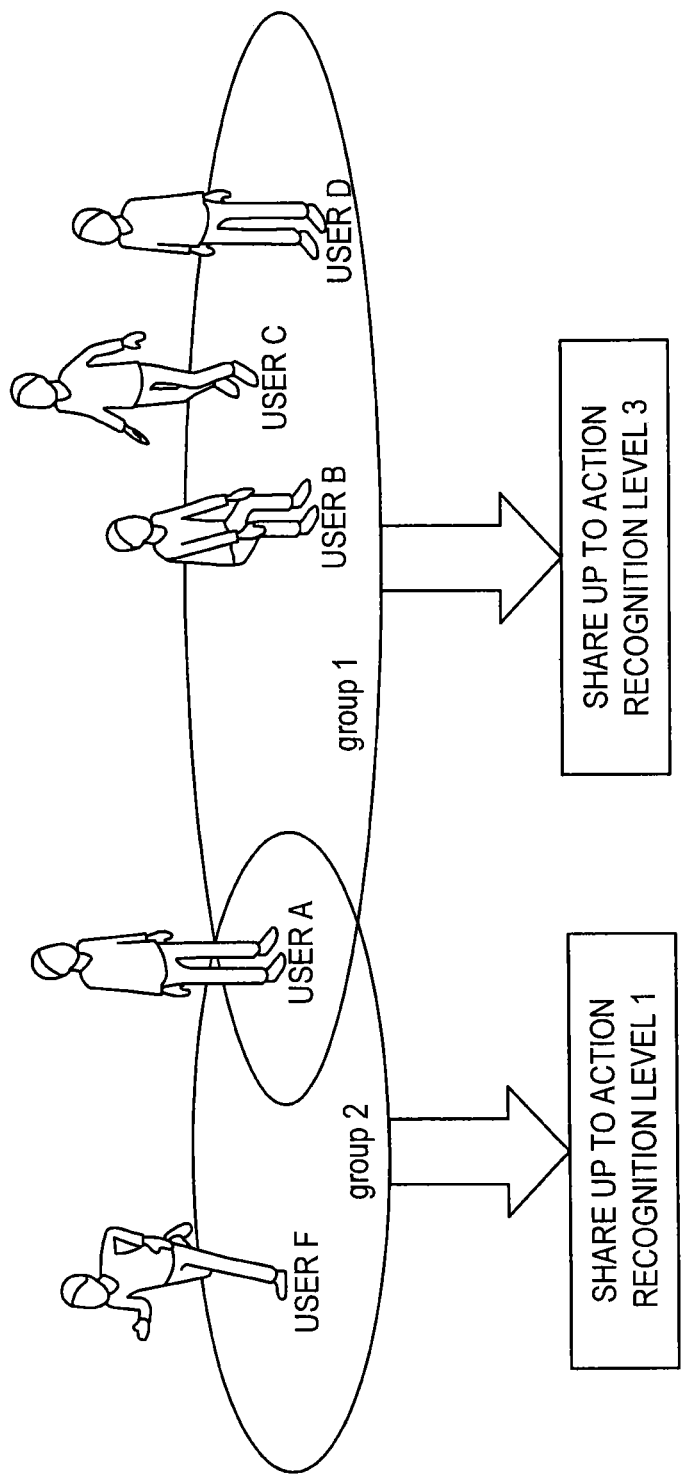
FIG. 13 is a schematic diagram illustrating an example of configuring an upper limit on the action recognition level with respect to the recipient group.

FIG. 13 is a schematic diagram illustrating an example of (A) configuring an upper limit on the action recognition level with respect to the recipient group. For example, as illustrated in FIG. 13, sharing is configured with action recognition level 3 as the upper limit for group 1, and sharing is configured with level 1 as the upper limit for group 2. Consequently, user F belonging to group 2only conducts action recognition with an upper limit of level 1, while the users A, B, C, and D belonging to group 1conduct action recognition with an upper limit of level 3.

The provision of action recognition results according to the operation of the user terminals 500A, 500B, and so on described in FIG. 8 is conducted for each group. If the users B, C, and D are not looking at the application on the display units 508B, 508C, and 508D of the user terminals 500B, 500C, and 500D, but the user F is looking at the application on the user terminal 500F, the user A may provide an action recognition result to the user F only, with an upper limit of action recognition level 1, which is the configured upper limit for group 2. As a result, power consumption may be reduced. If any of the users B, C, and D belonging to group 1start looking at the application, a notification similar to step S22 of FIG. 8 is sent from the user terminal possessed by that user to the server 100, and a notification similar to step S24 is sent from the server 100 to the other users belonging to group 1. As a result, an action recognition result is shared at action recognition level 2, which is the configured upper limit for group 1. Note that the public level for each group is stored in a database of the server 110, on the basis of registration information sent to the server 100 from each of the user terminals 500A, 500B, and so on.

Figure 14:
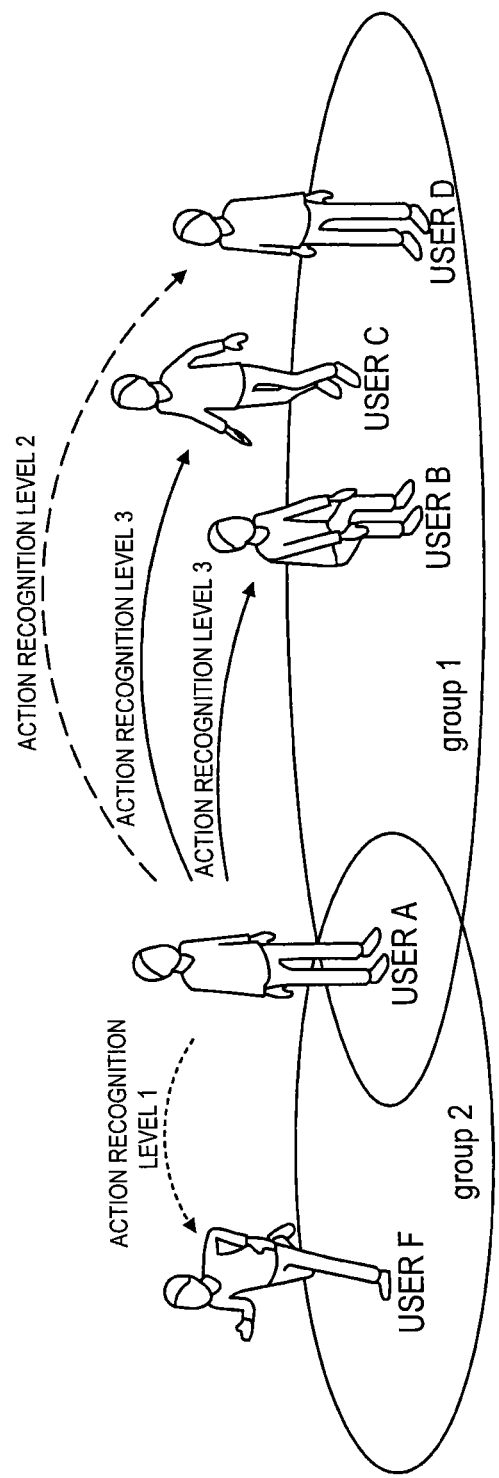
FIG. 14 is a schematic diagram illustrating an example of configuring an upper limit on the action recognition level that a user provides with respect to each recipient user.

FIG. 14 is a schematic diagram illustrating an example of (B) configuring an upper limit on the action recognition level that a user provides with respect to each recipient user. In this case, the action recognition level that a user makes public is configured for each recipient peer user. For example, as illustrated in FIG. 14, consider the case of configuring the action recognition level that the user A makes public with respect to each recipient peer. In the example illustrated in FIG. 14, the user A provides his or her own actions at action recognition level 3 with respect to the user B. Also, the user A provides his or her own actions at action recognition level 3 with respect to the user C, and provides his or her own actions at action recognition level 2 with respect to the user D. Note that, similarly to the above, when the users B and C are "not conducting terminal operation", the delivery of action recognition results to the users B and C may also not be conducted, and the user A may provide actions with an upper limit of action recognition level 2 with respect to the user D. Note that the public level for each user is stored in a database of the server 110, on the basis of registration information sent to the server 100 from each of the user terminals 500A, 500B, and so on.

[1.7. Example of Controlling Action Recognition Level According to Current Conditions of User]

Next, a method of controlling the action recognition level according to the current conditions of a user will be described. Hereinafter, the following methods (C-1) and (C-2) will be described. The action level to make public may be limited by each of (C-1) and (C-2) described hereinafter, either independently or in combination.

Figure 15:
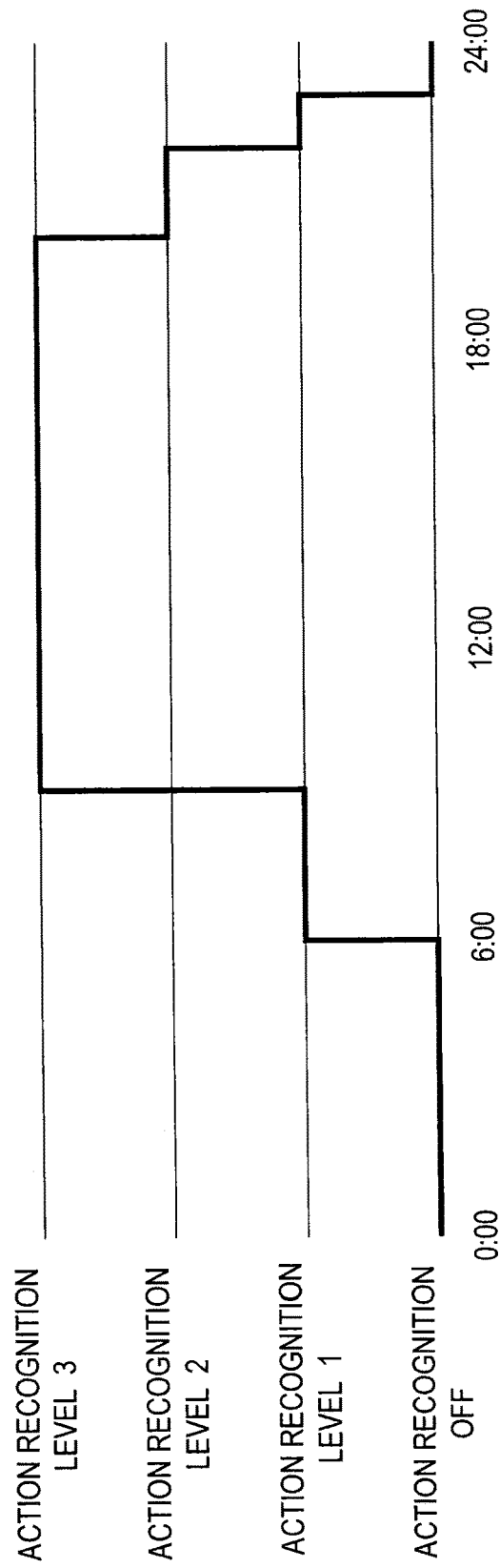
FIG. 15 is a schematic diagram illustrating an example of varying the action recognition level according to the time of day.

(C-1) As illustrated in FIG. 15, power consumption is reduced by configuring in advance an upper limit on the action recognition results that a user provides for individual time slots over a single day. FIG. 15 illustrates an example of varying the action recognition level according to the time of day, configured to not conduct action recognition at night when there are comparatively few user actions, and to provide detailed action recognition during the daytime when the user is active. The control units 504A, 504B, and so on of the user terminals 500A, 500B, and so on are equipped with a clock that acquires time information, and change the action recognition level by the action recognition units 506A, 506B, and so on as in FIG. 15 on the basis of the time information.

Figure 16:
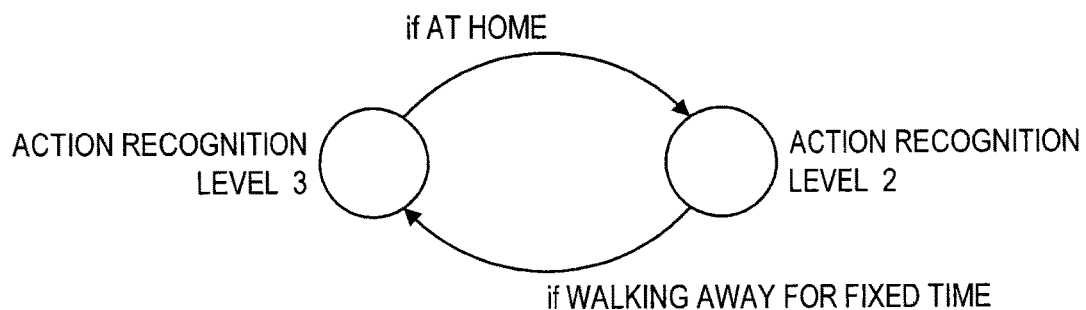
FIG. 16 is a schematic diagram illustrating an example of reducing power consumption by using the action recognition results of a user to control an upper limit on the level of action recognition result that a user provides.
Figure 17:
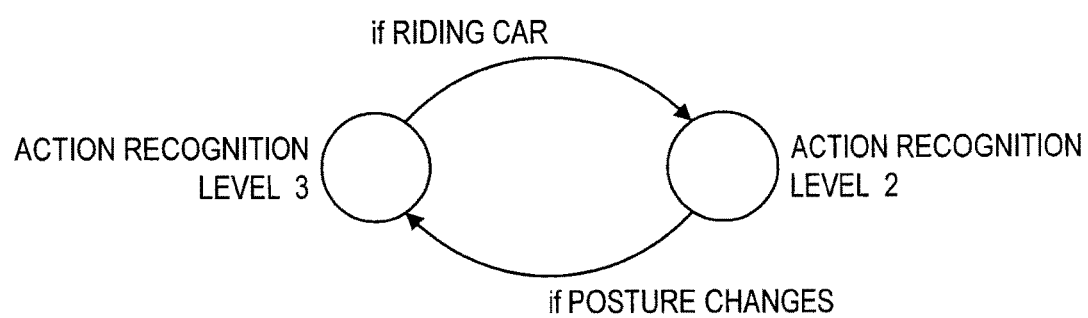
FIG. 17 is a schematic diagram illustrating an example of reducing power consumption by using the action recognition results of a user to control an upper limit on the level of action recognition result that a user provides.

(C-2) Power consumption is reduced by using the action recognition results of a user to control an upper limit on the level of action recognition result that a user provides. In the example illustrated in FIG. 16, when a user is recognized as being at home in the state of action recognition level 3, the action recognition level is lowered to "2". After that, power consumption is reduced by keeping the action recognition level lowered to "2" until a state of walking continues for a fixed time and the possibility that the location has changed is recognized. After the action recognition level is lowered to "2", if a state of walking continues for a fixed time and the possibility that the location has changed is recognized, the action recognition level is raised to "3". Also, the example illustrated in FIG. 17 illustrates an example in which, in conditions when the user is recognized as riding a car (automobile) at action recognition level 3, the action recognition level is lowered to "2", and power consumption is reduced by maintaining the lowered state at level 2 until a posture change occurs. After the action recognition level is lowered to "2", if a posture change occurs, the action recognition level is raised to 3. In either case, the control units 504A, 504B, and so on change the action recognition level by the action recognition units 506A, 506B, and so on based on action recognition results acquired by the action recognition units 506A, 506B, and so on.

[1.8. Example of Controlling Action Recognition Level According to Conditions of Terminal in Use]

Next, a method of reducing power consumption by controlling the action recognition level according to the conditions of the terminal in use will be described. Hereinafter, the following methods (D-1), (D-2), and (D-3) will be described. Note that each of (D-1), (D-2), and (D-3) illustrated hereinafter are applicable independently or in combination.

Figure 18:
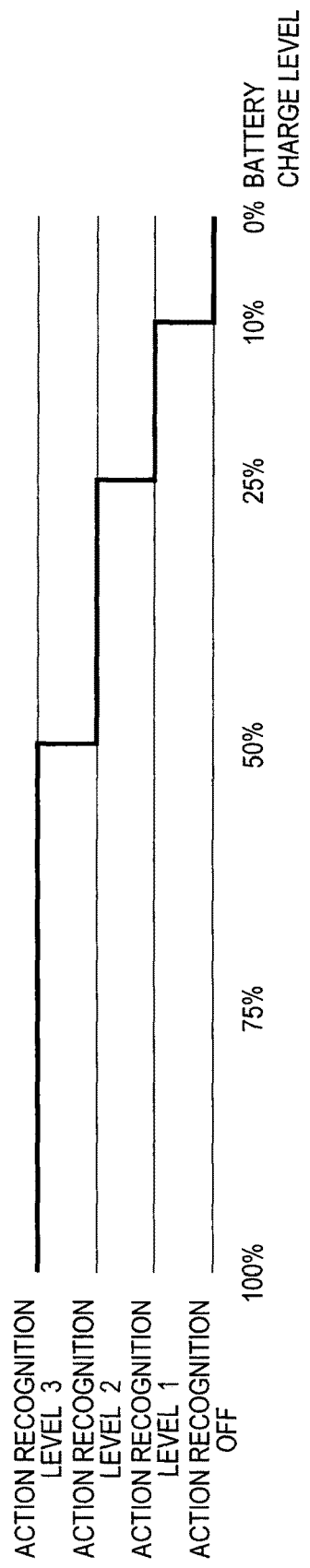
FIG. 18 is a schematic diagram illustrating an example of controlling the action recognition level according to battery charge level.

FIG. 18 illustrates an example of controlling the action recognition level according to the battery charge level of the user terminals 500A, 500B, and so on. It is possible to change the action recognition level according to changes in dynamic conditions of the user terminals 500A, 500B, and so on as illustrated in FIG. 18.

(D-1) The action recognition level is controlled according to the battery status. If the battery charge level decreases, the upper limit on the action recognition level is lowered to reduce power consumption. The example illustrated in FIG. 18 illustrates an example configuration of lowering the upper limit on the action recognition level to 2 while the battery charge level is from 50% to 25%, and conducting action recognition at level 1 while the battery charge level is from less than 25% to 10%. Consequently, since power consumption increases at higher action recognition levels, by lowering the action recognition level as the battery charge level decreases, the depletion of battery charge may be moderated.

Figure 19:
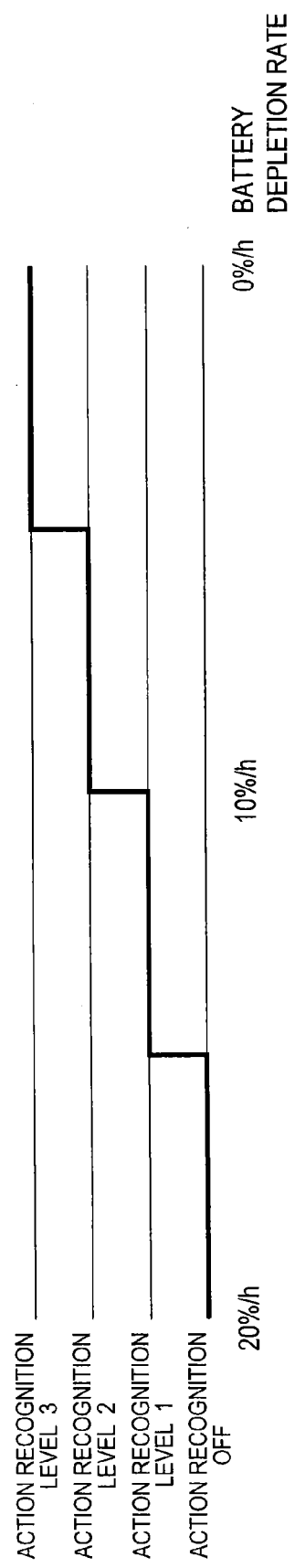
FIG. 19 is a schematic diagram illustrating an example of controlling the action recognition level according to the depletion rate of battery charge.

(D-2) The action recognition level is also lowered to reduce power consumption when the depletion rate of battery charge is rapid. In the example illustrated in FIG. 19, the upper limit on the action recognition level is lowered to level 2 when the battery charge depletion rate is faster than 5%/h, and lowered to level 1 when faster than 10%/h. Also, the example illustrated in FIG. 19 is configured to stop action recognition when the battery charge depletion rate is faster than 15%/h. Consequently, the depletion of battery charge may be moderated.

(D-3) Conditions of position information acquisition (GPS/Wi-Fi/3G . . . )

Action recognition is changed to an action recognition level that does not use position information under conditions in which the user terminals 500A, 500B, and so on are unable to acquire position information. As a result, it is possible to deter the user terminals 500A, 500B, and so on from wastefully consuming power in the attempt to acquire position information. Additionally, depending on the precision of the position information acquired by the user terminals 500A and 500B, the action recognition level may also be lowered when the current precision of action recognition cannot be ensured.

In the case of (D-1) and (D-2), the control units 504A, 504B, and so on of the user terminals 500A, 500B, and so on acquire the charge level or the battery depletion rate of a battery (not illustrated in FIG. 7) of the user terminals 500A, 500B, and so on, and change the action recognition level by the action recognition units 506A, 506B, and so on based on the battery charge level or the battery depletion rate. Also, in the case of (D-3), in conditions in which position information cannot be acquired by GPS or the like, the action recognition units 506A, 506B, and so on notify the control units 504A, 504B, and so on, and the control units 504A, 504B, and so on change the action recognition units 506A, 506B, and so on to an action recognition level that does not use position information.

[1.9. Process Flow of First Embodiment]

Figure 20:
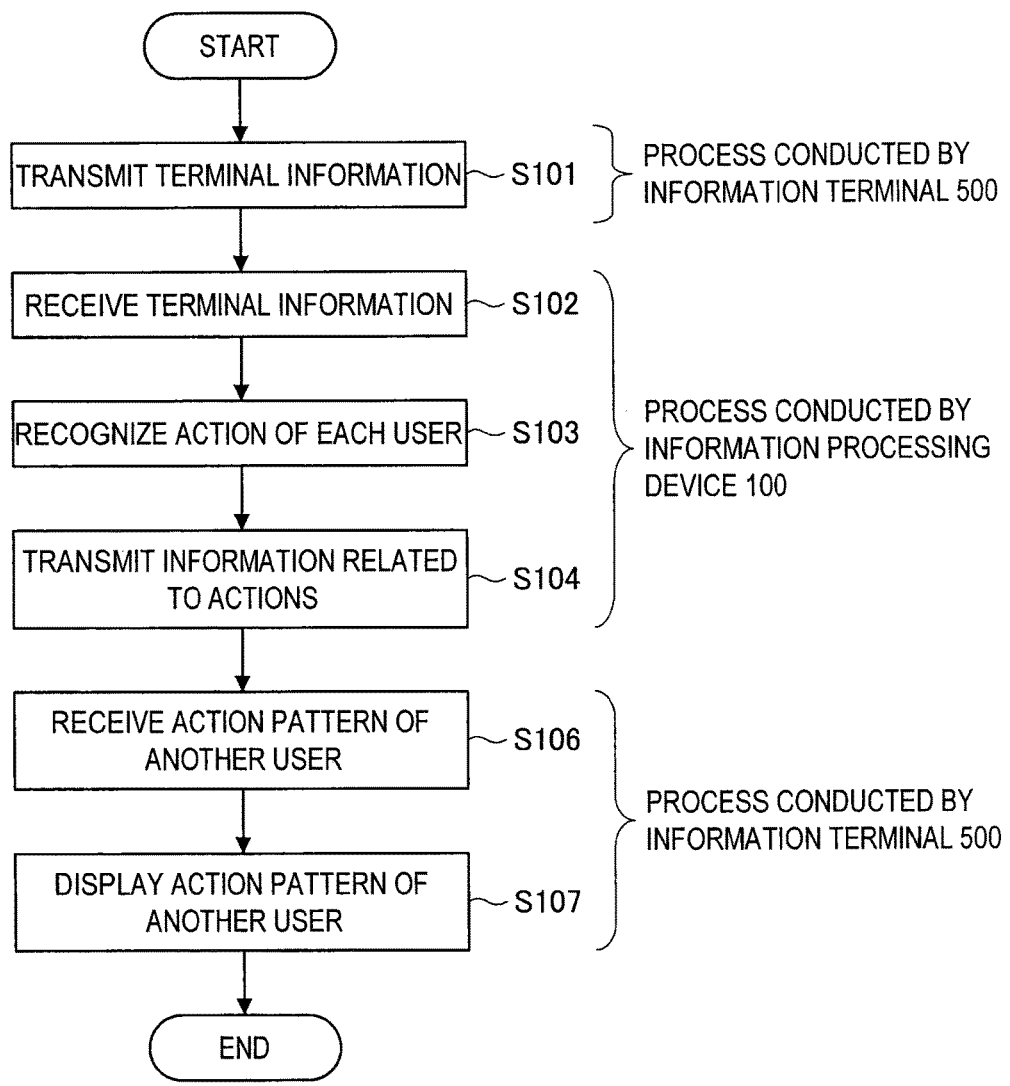
FIG. 20 is a flowchart illustrating a process of the first embodiment.

FIG. 20 is a flowchart illustrating a process of the present embodiment. First, in step S101, the user terminals 500A, 500B, and so on transmit terminal information to the server 100. In the next step S102, the server 100 receives the terminal information sent from the user terminals 500A, 500B, and so on. The terminal information includes information related to the user terminals 500A and 500B (such as operation information, sensor information, and position information).

In the next step S103, the server 100 recognizes the action of each user terminal 500 on the basis of the terminal information.

In the next step S104, the server 100 transmits action patterns provided to each user terminal 500. In the next step S106, each user terminal 500 receives the actions of other users transmitted by the server 100 in step S104. In the next step S107, each user terminal 500 displays the action patterns of other users.

According to the first embodiment as described above, by controlling the action recognition level, it becomes possible to reduce power consumption.

<2. Second Embodiment>

[2.1. Presupposed Technology]

Figure 21:
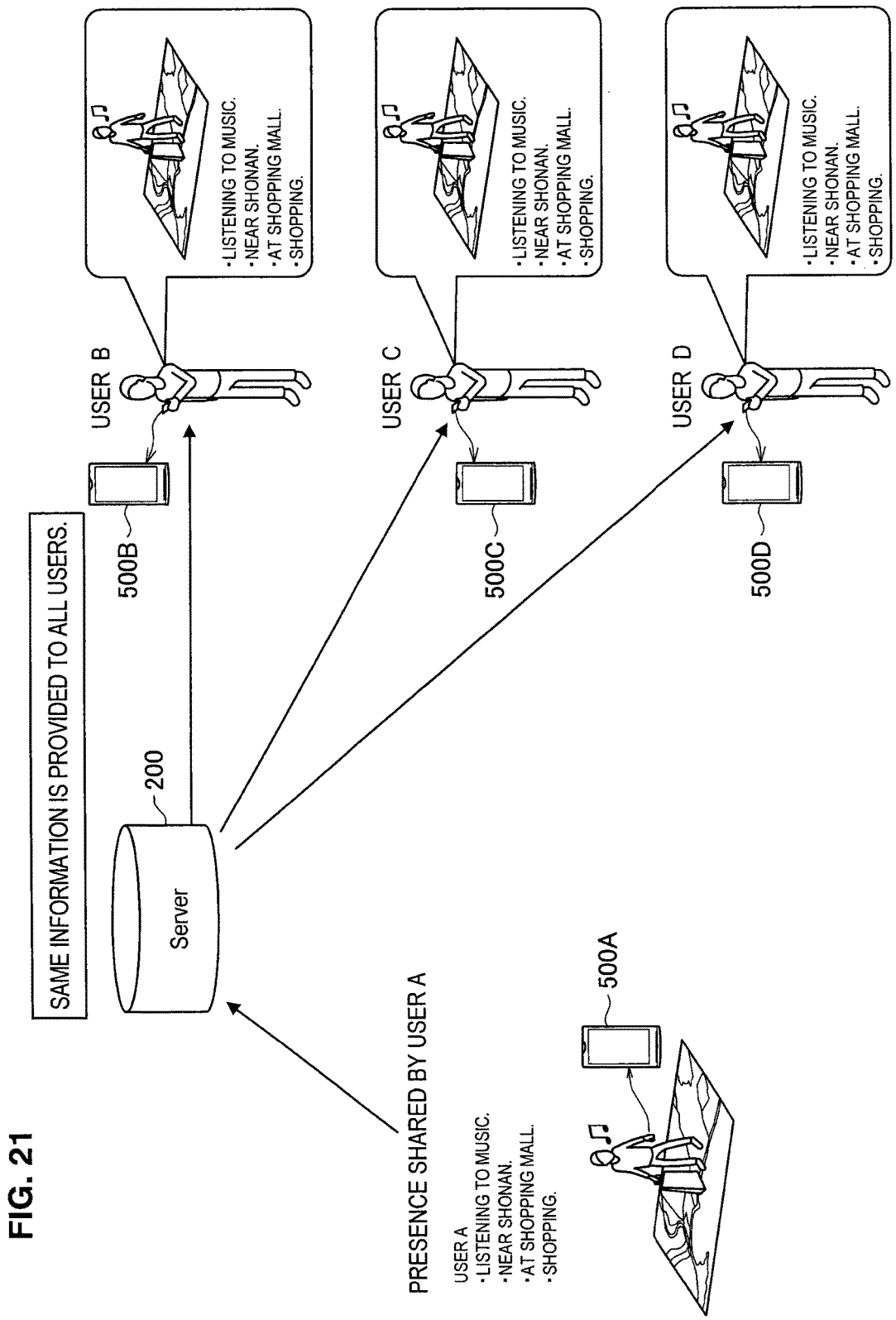
FIG. 21 is a schematic diagram illustrating a mechanism of sharing the actions of friends in technology presupposed by the second embodiment.

Next, the second embodiment of the present disclosure will be described. FIG. 21 is a schematic diagram illustrating a mechanism of sharing the actions of friends in technology presupposed by the present embodiment. Similarly to the first embodiment, the system according to the second embodiment includes a server 200, a user terminal 500A, a user terminal 500B, a user terminal 500C, and so on. The user terminal 500A, the user terminal 500B, the user terminal 500C, and so on are respectively used by a user A, a user B, a user C, and so on.

In FIG. 21, each user terminal 500A, user terminal 500B, user terminal 500C, and so on is able to transmit information such as "listening to music", "near Shonan", "at a shopping mall", and "shopping" to the server 200 via a wireless communication network.

However, with the system illustrated in FIG. 21, the action recognition results provide to a group or an individual is uniform, and the configuration of a public level is not considered. Accordingly, the present embodiment provides a new user experience by "enabling the configuration of a public level for action recognition results that a user makes public, and dynamically varying the public level according to the conditions of the user him- or herself, or the recipient peer". In the present embodiment, making public one's own unwanted actions may be avoided, and personal information may be protected.

[2.2. System Configuration of Second Embodiment]

Figure 22:
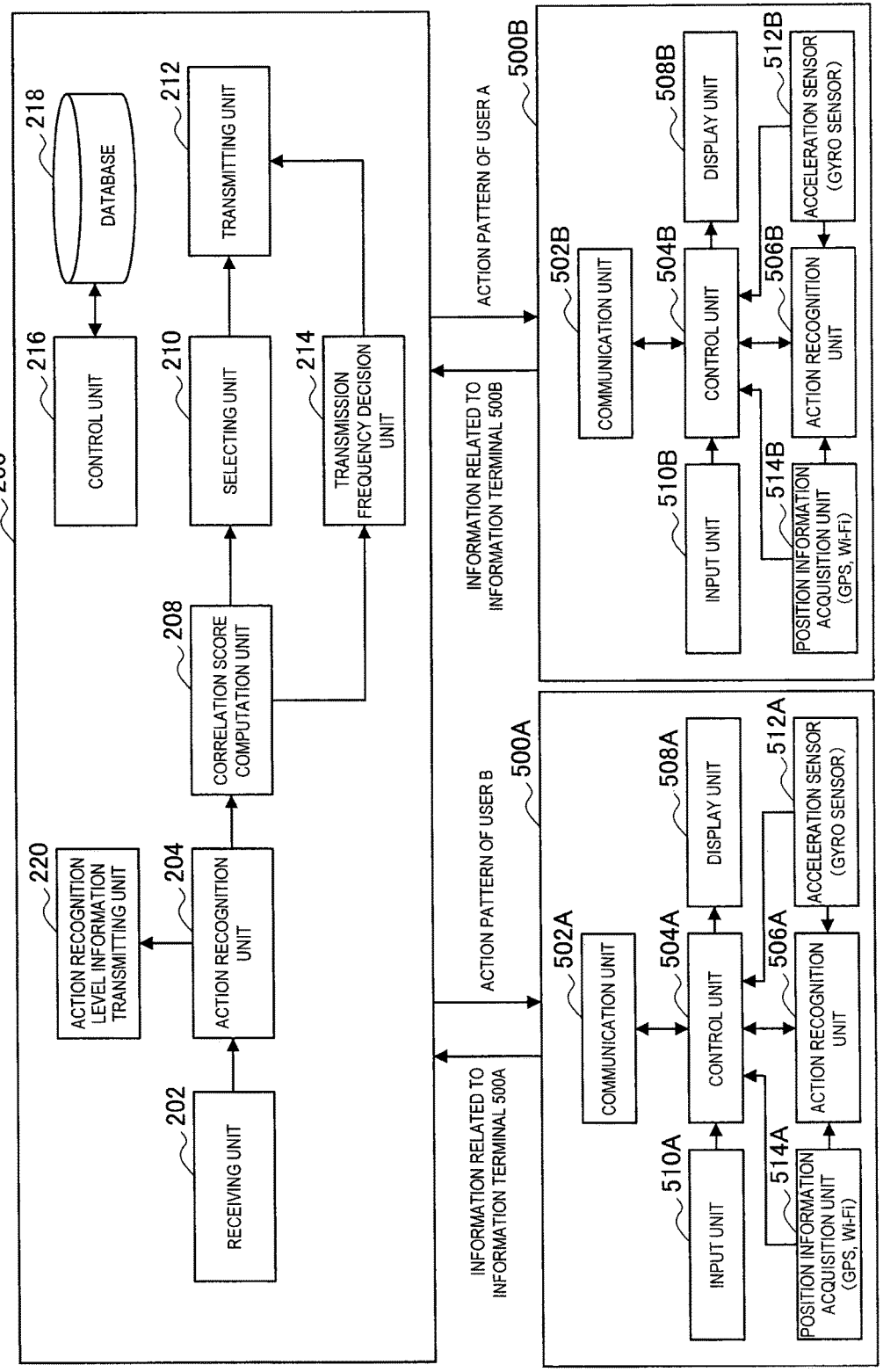
FIG. 22 is a schematic diagram illustrating a configuration of a server and user terminals according to the second embodiment.

FIG. 22 is a schematic diagram illustrating a configuration of the server 200 and the user terminals 500A and 500B according to the second embodiment. As illustrated in FIG. 22, the server 200 includes a receiving unit 202, an action recognition unit 204, a correlation score computation unit 208, a selecting unit 210, a transmitting unit 212, a transmission frequency decision unit 214, a control unit 216, and a database 218. The configuration of the user terminal 500A, user terminal 500B, user terminal 500C, and so on is similar to the first embodiment.

The communication unit 502A of the user terminal 500A transmits information related to the user terminal 500A (such as operation information, sensor information, and position information) to the server 200. Additionally, the communication unit 502A may also transmit an action recognition result obtained by the action recognition unit 506A to the server 100. The action recognition unit 506A recognizes an action using the first technique or second technique discussed earlier on the basis of information related to the user terminal 500A obtained from the input unit 510A, the acceleration sensor 512A, and the position information acquisition unit 514A (such as operation information, sensor information, and position information). Also, the user terminal 500A receives an action pattern (action recognition result information) of the user B from the server 200. Similarly, the communication unit 502B of the user terminal 500B transmits information related to the user terminal 500B obtained from the input unit 510B, the acceleration sensor 512B, and the position information acquisition unit 514B (such as operation information, sensor information, and position information) to the server 200. Additionally, the communication unit 502B may also transmit an action recognition result obtained by the action recognition unit 506B to the server 100. The action recognition unit 506B recognizes an action using the first technique or second technique discussed earlier on the basis of information related to the user terminal 500B obtained from the input unit 510B, the acceleration sensor 512B, and the position information acquisition unit 514B (such as operation information, sensor information, and position information). Also, the communication unit 502B of the user terminal 500B receives an action pattern (action recognition result information) of the user A from the server 200.

The receiving unit 202 of the server 200 receives information such as operation information, sensor information, and position information from the user terminals 500A and 500B. Also, the receiving unit 202 of the server 200 receives an action recognition result when the user terminal 500A or 500B transmits an action recognition result obtained by the action recognition unit 506A or 506B. The action recognition unit 204 recognizes a user's action on the basis of information such as operation information, sensor information, and position information sent from the user terminal 500A or 500B. At this point, the action recognition unit 104 recognizes an action using the first technique or the second technique discussed earlier. Also, when the user terminal 500A or 500B transmits an action recognition result obtained by the action recognition unit 506A or 506B, the action recognition unit 104 recognizes a user's action according to the received action recognition result. The correlation score computation unit 208 computes a correlation score of the actions of the respective users A and B of the user terminals 500A and 500B. The selecting unit 210 selects user actions to transmit to the user terminals 500A and 500B on the basis of the correlation score. The transmitting unit 212 transmits (information about) user actions selected by the selecting unit 210 to each of the user terminals 500A and 500B. The transmission frequency decision unit 214 decides a transmission frequency at which the transmitting unit 212 transmits user actions. The action recognition level information transmitting unit 220 specifies the action recognition level discussed later so as to raise the action recognition level to "2" or higher, and transmits action recognition level information to each of the user terminals 500A and 500B. The control unit 216 is made up of components such as a central processing unit (CPU), and controls the server 200 overall. The database 218 is a storage unit that stores data, and stores information such as the action recognition level discussed later, and the groups to which each user belongs. The transmission frequency decision unit 214 decides a transmission frequency at which the action recognition information transmitting unit 106 transmits recognized user actions.

As above, the server 200 may conduct action recognition for each user with the action recognition unit 104 on the basis of information acquired from the user terminals 500A and 500B (such as operation information, sensor information, and position information). Additionally, the user terminals 500A and 500B may conduct action recognition with the action recognition units 506A and 506B, respectively. In the case of the server 200 conducting action recognition on the basis of information acquired from the user terminals 500A and 500B (such as operation information, sensor information, and position information), the processing load on the user terminals 500A and 500B may be further reduced.

Note that each structural element of the server 200 illustrated in FIG. 22 may be configured by a circuit (hardware), or by the control unit 216 and a program (software) causing the control unit 216 to function. In this case, the program may be stored in a storage unit (the database 218) provided in the server 200.

[2.3. Presence Sharing Levels]

Figure 23:
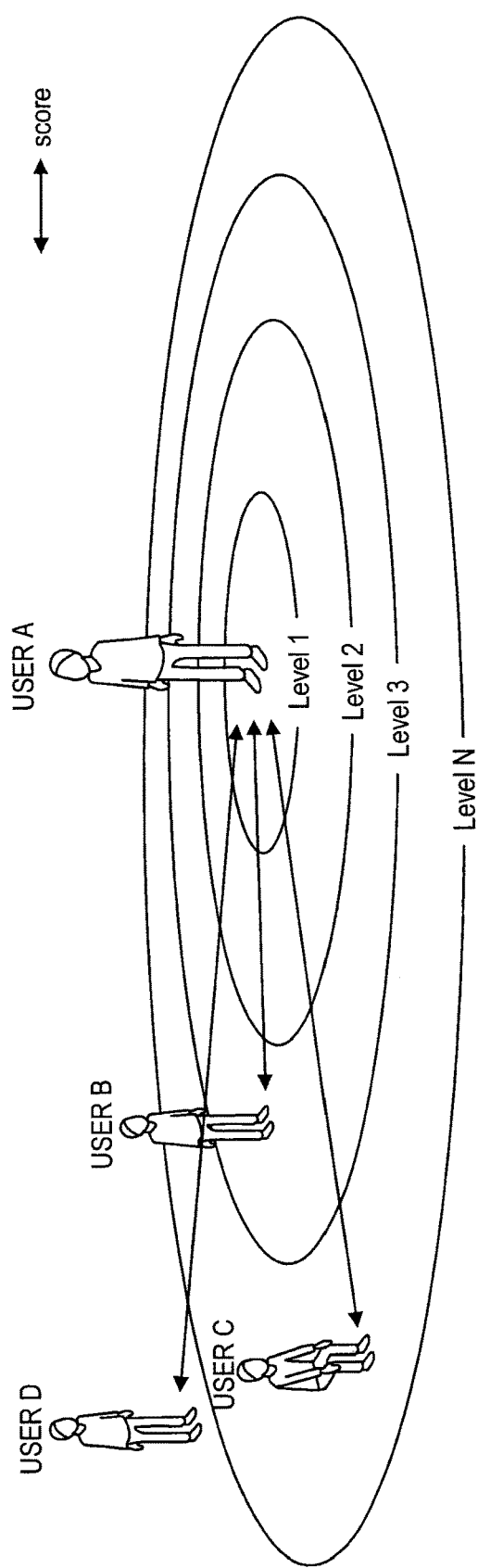
FIG. 23 is a schematic diagram illustrating an overview of a process of the second embodiment.

FIG. 23 is a schematic diagram illustrating an overview of a process of the second embodiment. As illustrated in FIG. 23, each user holds a sharing level of his or her own presence (action/status) at multiple levels. FIG. 23 illustrates a mechanism of sharing the user A's presence with the users B, C, and D. The user A is able to configure the sharing level for sharing his or her own presence from 1 to N, with the levels existing in an inclusion relationship. Also, the users B, C, and D score their relationship with the user A according to a certain measure, and by dynamically computing the score according to relative conditions with the user A, the presence results provided by the user A vary. Suppose that more detailed information is shared as the sharing level approaches 1, and that the sharing level 1 shares the most detailed information.

FIG. 24 is a schematic diagram illustrating an example of presence to share. As illustrated in FIG. 14, the presence to share may include body information, position information, action information, environment information, audio-visual information, appearance information, buddy information, and thought information. This information is acquired (detected) by the action recognition units 506A, 506B, and so on of each of the user terminals 500A, 500B, and so on.

Also, FIG. 25 is a schematic diagram illustrating indices for deciding the level at which to share presence. As illustrated in FIG. 25, the sharing level is configured according to geographical distance, correlation of location attributes, correlation of action patterns, the remaining time until an event that users have mutually configured, and degree of closeness.

Also, FIGS. 26 to 28 are schematic diagrams illustrating presence and sharing levels. As illustrated in FIGS. 26 to 28, the presence sharing level is divided into four tiers, and the level at which to provide presence such as audio-visual information, action information, and position information is configured for each user and registered in the server 200. The sharing level is registered in the database 218 of the server 200. At this point, the same configuration may be used for all peers to share with, or the configuration may be changed for each peer to share with.

Figure 29:
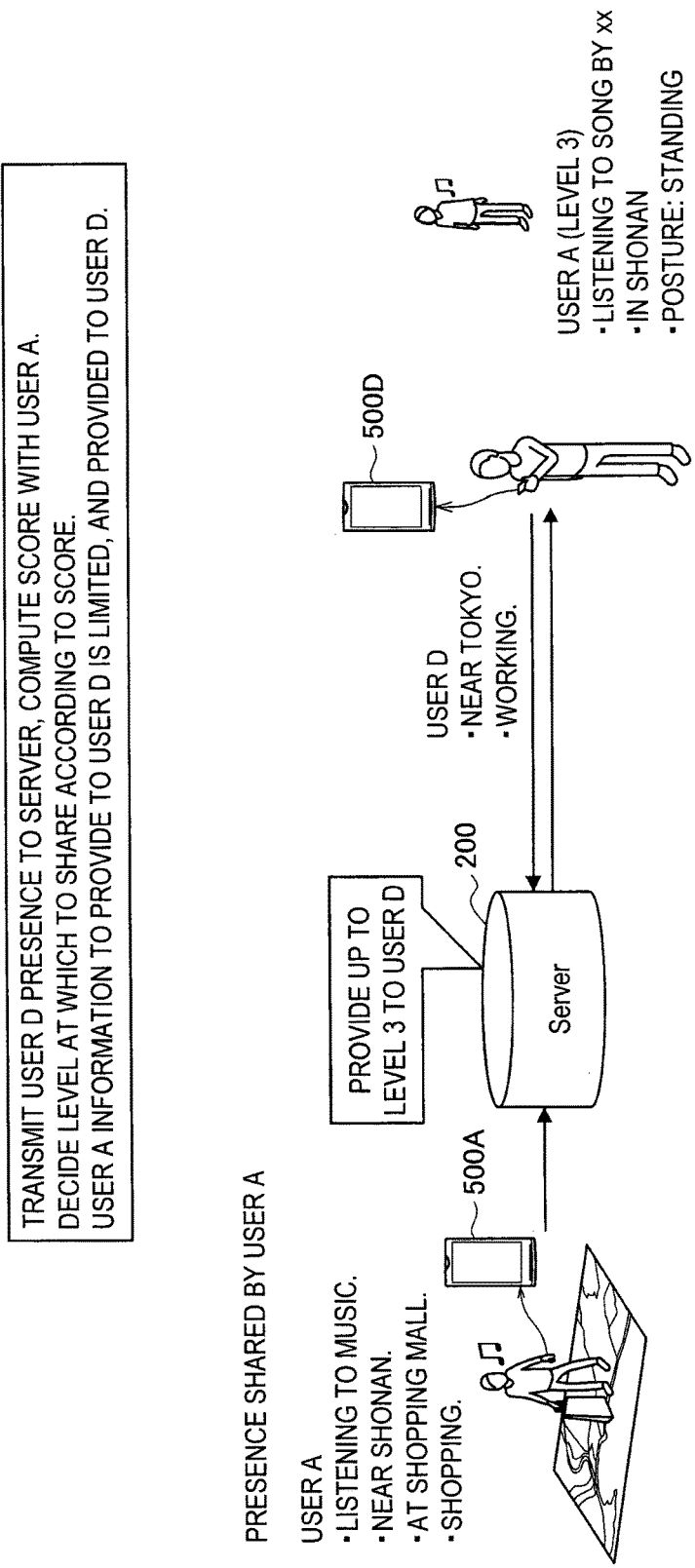
FIG. 29 is a schematic diagram illustrating a mechanism of sharing the actions of friends in the second embodiment.

FIG. 29 is a schematic diagram illustrating a mechanism of sharing the actions of friends in the second embodiment. As illustrated in FIG. 29, the presence of the user D is transmitted to a server, and the score between the user D and the user A is computed. Subsequently, a sharing level is decided from the computed score, and the user A's information to provide to the user D is limited, and provided to the user D. FIGS. 30 to 32 illustrate sharing levels of presence between the user A and the user D, in which the sharing level is set to level 3 for each of audio-visual information, action information, and position information. Consequently, in the example illustrated in FIG. 29, for each of audio-visual information, action information, and position information, information up to level 3 is shared between the user A and the user D.

Figure 33:
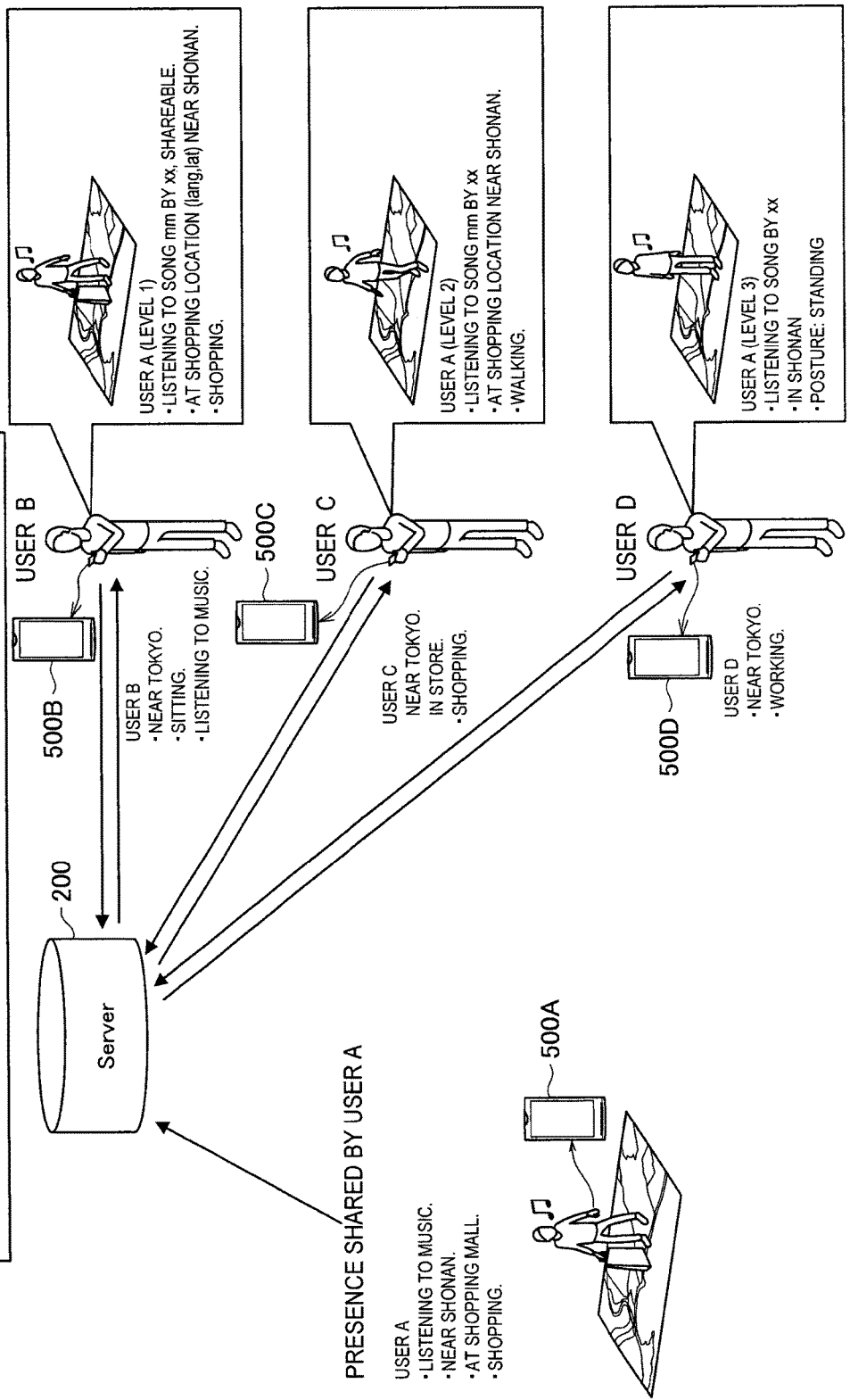
FIG. 33 is a schematic diagram illustrating how information is provided according to the presence of the receiving user.

FIG. 33 is a schematic diagram illustrating how information is provided according to the presence of the receiving user. As illustrated in FIG. 33, suppose that the user A is listening to music, near Shonan, at a shopping mall, and shopping. The user B has a sharing level of "1" with the user A, so that an artist name, the title of the song currently playing, and the song currently playing are shareable as audio-visual information, "at a shopping location near Shonan" is shareable as position information, and "shopping" is shareable as action information. The user C has a sharing level of "2" with the user A, so that an artist name and the title of the song currently playing are shareable as audio-visual information, "at a shopping location near Shonan" is shareable as position information, and "walking" is shareable as action information. The user D has a sharing level of "3" with the user A, so that an artist name is shareable as audio-visual information, "near Shonan" is shareable as position information, and "standing" is shareable as action information. In this way, it is possible to vary the information shared between the user A and each of the users B to D according to the sharing level with the user A.

FIG. 34 is a schematic diagram illustrating sharing levels and scores. For example, suppose that the score takes a value from 0.0 to 1.0, with a larger score value allowing more detailed presence to be shared. As illustrated in FIG. 34, scores and sharing levels are associated. The same score may be assigned to all levels of presence to share, or scores may be assigned individually to each presence.

For example, the same score may be assigned to each of audio-visual information, action information, and position information, or different individual scores may be assigned to each of audio-visual information, action information, and position information.

[2.4. Correlation Computation According to Sub-Score]

Next, sub-scores will be described. Also, multiple sub-scores may be calculated according to measures like the following, and the weighted sum of each of these sub-scores may be treated as the score between users. For example, variables like the following are defined.

Sub-score computed from geographical distance: Sgeo
Correlation of location attributes: Slcorr
Correlation of action patterns: Sacorr
Remaining time until a configured time: Stime The score ScoreStoA of the user B with respect to the user A may be expressed as follows by using a weighting coefficient W.

$$ScoreBtoA=(Wgeo*Sgeo+Wlcorr*Slcorr+\\Wacorr*Sacorr+Wtime*Stime)/Wsum$$

$$Wsum=Wgeo+Wlcorr+Wacorr+Wtime$$

$$(0.0 \leq W \leq 1.0, \text{where } 0.0 < Wsum, 0.0 \leq S \leq 1.0)$$

Additionally, an individual ScoreBtoA may also be computed for the presence to share.

Also, as illustrated in FIG. 25, measures for deciding whether to share may be the following.
Geographical distance
Correlation of location attributes (such as both users being at a shopping location)
Correlation of action patterns (such as both users riding a train)
Remaining time until a mutually configured event
Degree of closeness (such as frequency of conversation)

For the sub-score Sgeo, latitude, longitude, and altitude may be used to compute a distance between users, and a score may be computed according to the distance. For example, as illustrated in FIG. 35, the distance between a user X and a user Y (distxy) may be computed, and if the distance distxy is less than or equal to a threshold value distA, a score of 1.0 is set, while if equal to or greater than distB, a score of 0.0 is set, and if in between, an intermediate value is set. In this way, by raising the sub-score as the distance becomes shorter, the sharing level may be raised, enabling more detailed information to be shared.

Also, FIG. 36 is a schematic diagram illustrating an example of scoring according to the remaining time until a configured time. The sub-score Stime may be configured on the basis of the remaining time until a configured time. For example, consider a situation in which users are going to meet each other in a certain location at a certain time. Ordinarily, when the time of the meeting draws near, or when the time of the meeting has passed, one user would feel a desire to know the detailed conditions of the other user. On the other hand, if the time of the meeting is still in the future, there is no need to know the detailed conditions of the other user, and detailed information about the other user would be redundant information. As illustrated in FIG. 36, as an example of a sub-score computation method, provided that Remain is the remaining time obtained from the time when an event such as a meeting will occur and the current time, a score of 1.0 is set when Remain becomes less than or equal to a certain remaining time remainA, and a score of 0.0 is set when equal to or greater than remainB. An intermediate value is set as the sub-score when the remaining time is between remainA and remainB. As a result, it becomes possible to share more detailed information as the time of the meeting draws near.

Next, the correlation of action patterns (sub-score Sacorr) will be described. User actions or combinations of actions, such as "shopping", "working", "riding a train", and "commuting", are treated as action patterns, and a correlation is computed. For example, when each user is in a "riding a train" state, regardless of location, there is a high likelihood that the users are experiencing similar conditions, and thus the users may be currently interested in similar things, and in a state in which sharing detailed conditions is meaningful. Consequently, by raising the sharing level for closer correlation of action patterns, more detailed information may be shared.

FIG. 37 is a schematic diagram illustrating the correlation of action patterns. As illustrated in FIG. 37, as an example of a correlation computation method, a table defining correlations between respective actions may be used. According to the table in FIG. 37, the correlation between the actions of the user X and the user Y may be searched on the basis of the current actions of the user X and the user Y. As a result, a correlation may be computed on the basis of the actions of the user X and the user Y.

Next, location attributes (sub-score Slcorr) will be described. Action information related to a certain location, such as "shopping location", "study location", and "work location", is treated as a location attribute. Even if users are distantly separated from each other, when both are at a location with the same location attributes, there is a high likelihood that the users are performing similar actions, and thus the users may be currently interested in similar things, and in a state in which sharing detailed conditions is meaningful. Consequently, the score between the user X and the user Y rises as the relevance of the locations rises.

Also, even in conditions in which location attributes cannot be uniquely decided, a score may be computed by comparing geo-category histograms. Geo-category histograms are described in Patent Literature 3 discussed earlier, for example. As one correlation computation method, consider a vector Geo whose vector elements are the respective elements of a geo-category histogram.

The correlation Corrxy between a Case X and a Case Y may be expressed as $$Corrxy = Geox \cdot Geoy / (|Geox||Geoy|)$$

Figure 38:
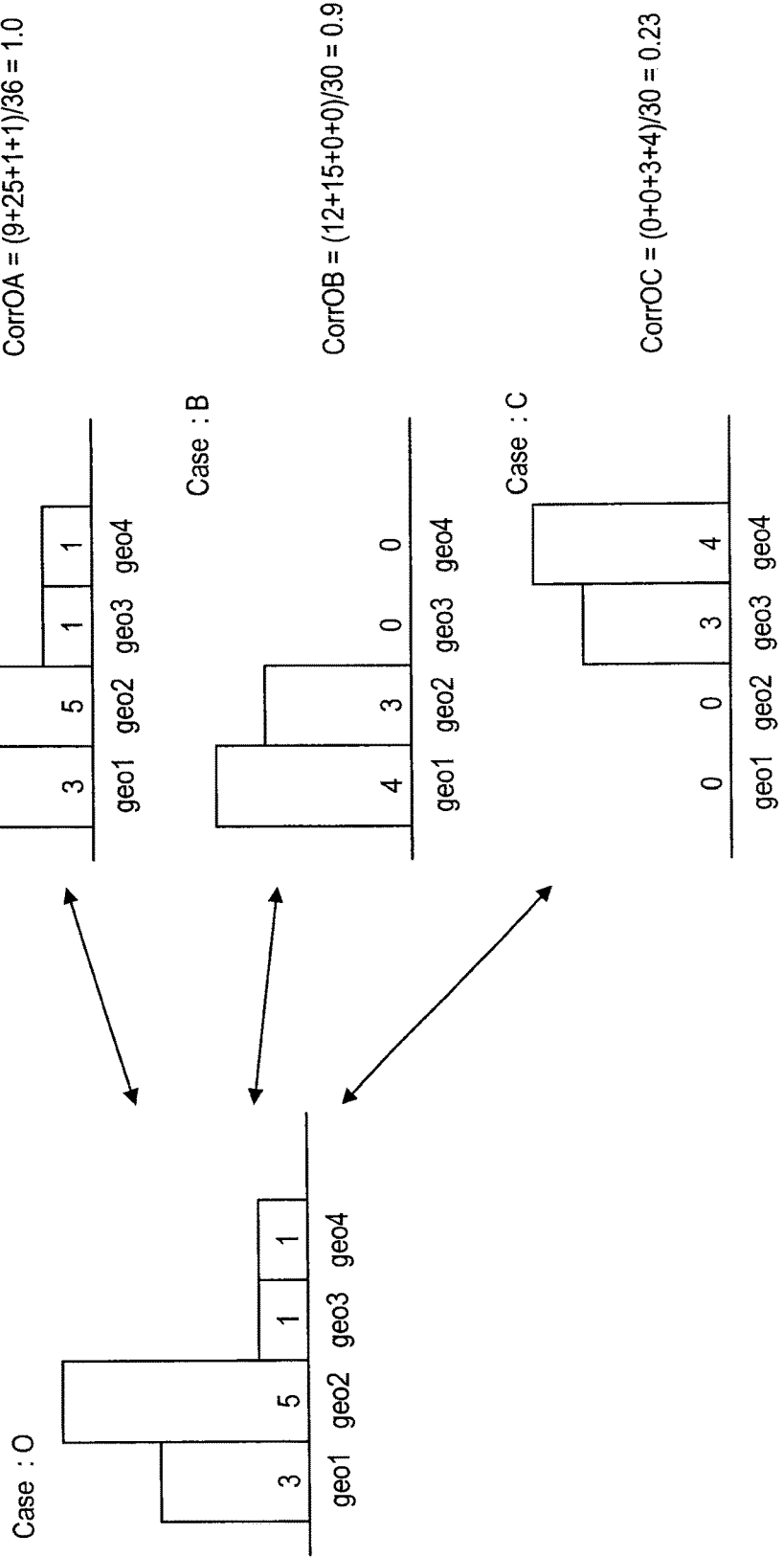
FIG. 38 is a schematic diagram illustrating an example of computing a score by comparing geo-category histograms.

For example, suppose that there is a geo-category histogram made up of four elements as illustrated in FIG. 38. Suppose that the frequency takes a value equal to or greater than 0. In the example illustrated in FIG. 38, the correlation between Case O and Case A (1.0) is the highest, while the correlation between Case O and Case C (0.23) is the lowest.

Figure 39:
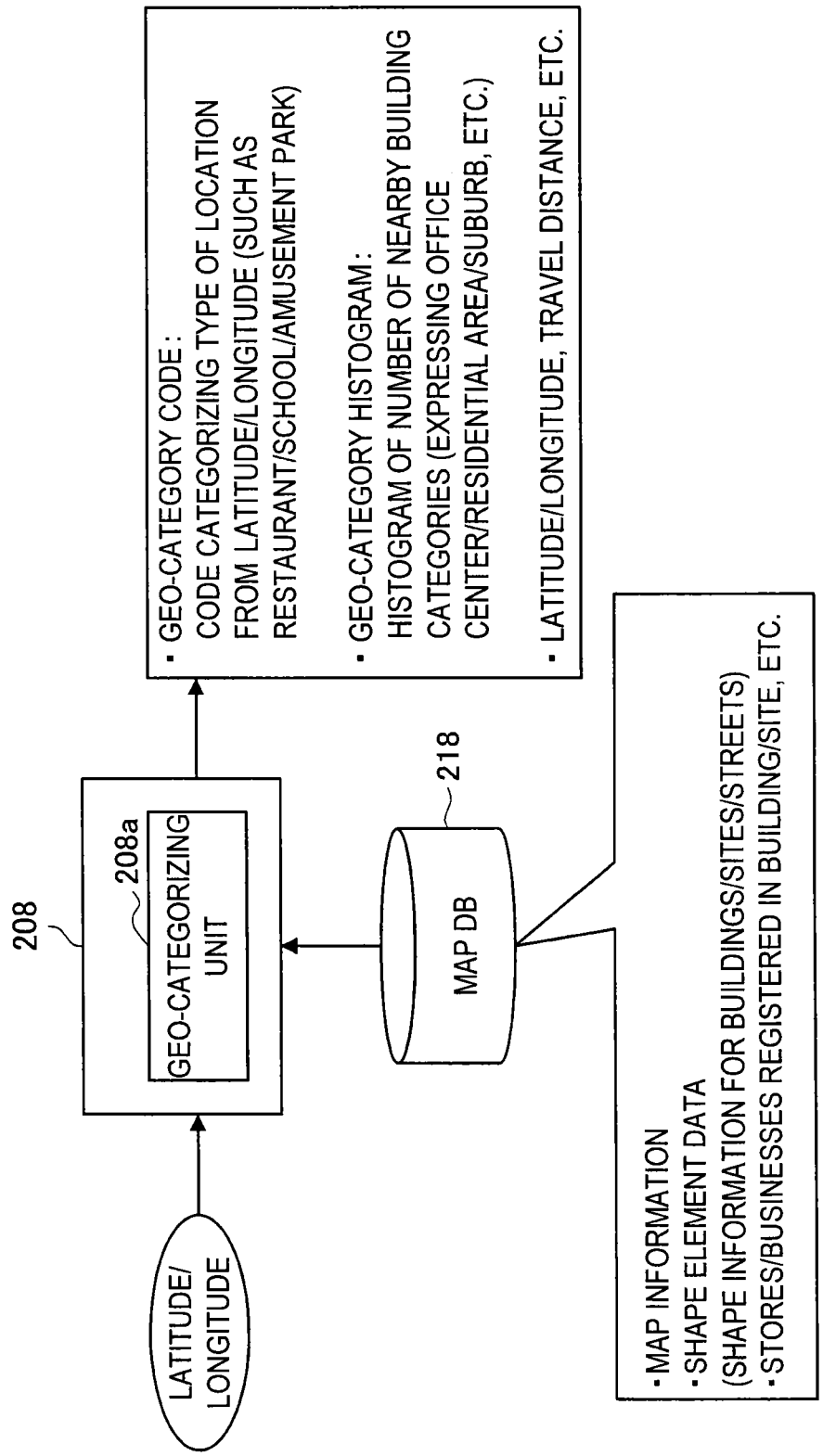
FIG. 39 is a schematic diagram illustrating a geo-categorizing unit and peripheral elements.

FIG. 39 is a schematic diagram illustrating a geo-categorizing unit 208a included in the correlation score computation unit 208 of the server 200, and peripheral elements. The geo-categorizing unit 208a accepts latitude/longitude data as input, references a map database (which may also not be a special-purpose map database), and outputs a position category (geo-category) and a quantification of nearby categories (geo-category histogram). The latitude/longitude data may be for a single point, or time-series data. Additionally, the latitude/longitude data may be expressed as a representative point clustered according to clustering technology.

[2.5. Process Flow of Second Embodiment]

Figure 40:
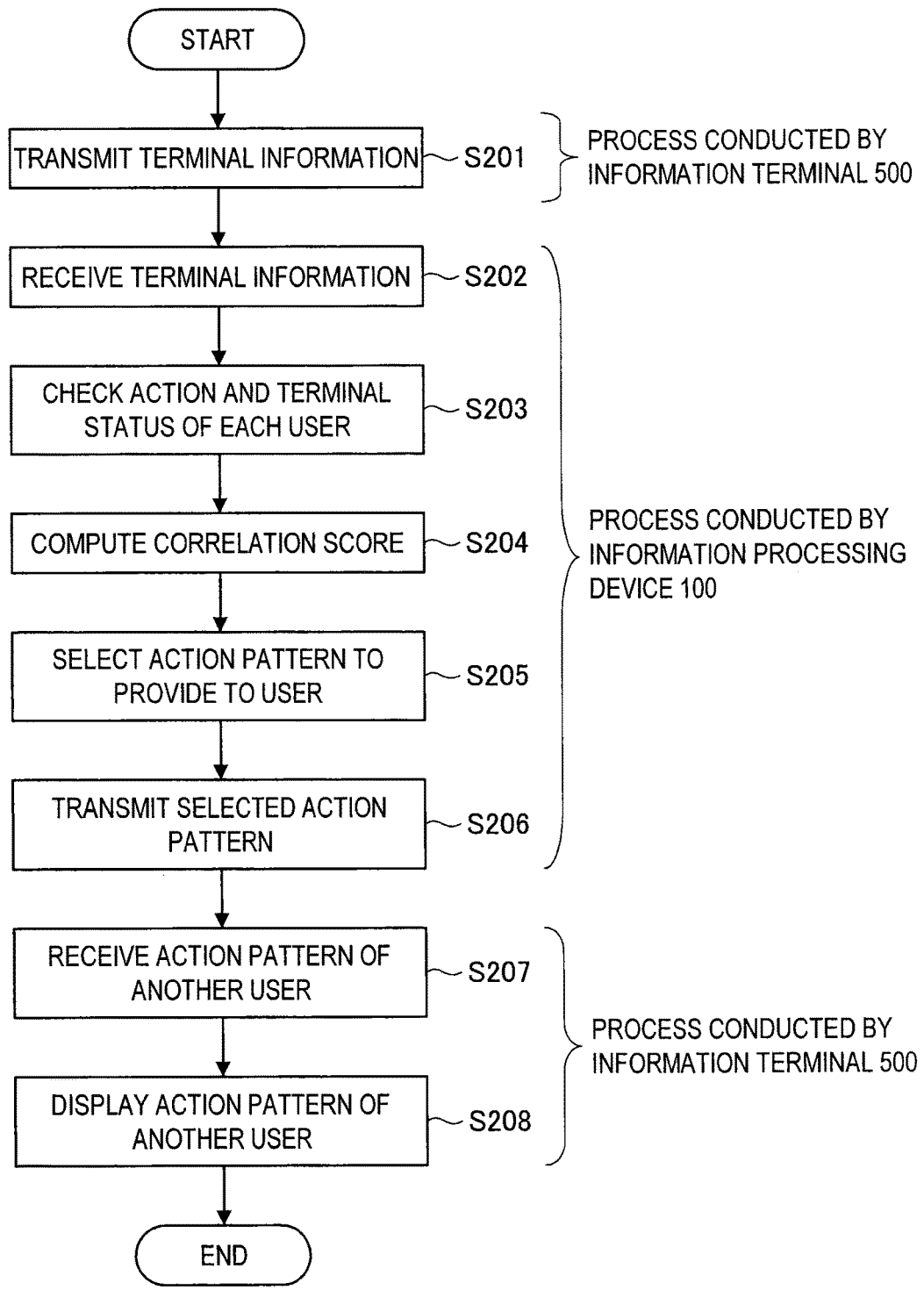
FIG. 40 is a flowchart illustrating a process of the second embodiment.

FIG. 40 is a flowchart illustrating a process by the server 200 of the second embodiment. First, in step S201, the user terminal 500A, user terminal 500B, user terminal 500C, and so on transmit terminal information to the server 200. In the next step S202, the server 200 receives the terminal information. The terminal information includes information about presence such as audio-visual information, action information, and position information. In the next step S203, the server 200 recognizes the action and terminal status of each user. In the next step S204, the server 200 computes correlation scores. In the next step S205, actions to provide to users are selected on the basis of the correlation scores. In the next step S206, the user actions selected by the server 200 are transmitted. In the next step S207, the user terminal 500A, user terminal 500B, user terminal 500C, and so on receive the user actions transmitted in step S206. In the next step S208, the user terminal 500A, user terminal 500B, user terminal 500C, and so on display the actions of other users on the basis of the actions received in step S207.

[2.6. Example of Configuring an Upper Limit on Action Recognition Level with Respect to Each Recipient User, and Linking with Presence Sharing Technology]

Next, an example of (B') configuring an upper limit on the action recognition level that a user provides with respect to each recipient user, and linking with presence sharing technology, will be described on the basis of FIG. 41. In this case, similarly to the first embodiment, the action recognition level that a user makes public is configured for each recipient peer user. In addition, similarly to the first embodiment, when the users B and C are "not conducting phone operation", the delivery of action recognition results to the users B and C may also not be conducted, and the user A may conduct action recognition sharing level 2 as an upper limit. Furthermore, if the "method of dynamically updating the presence sharing level" is applied, even when the users B and C are "conducting phone operation", the public level of action recognition to provide may be progressively changed according to a correlation score between the actions of the users B and C, and the actions of the user A. Consequently, the action recognition public level may be configured to the required action recognition level.

Figure 41:
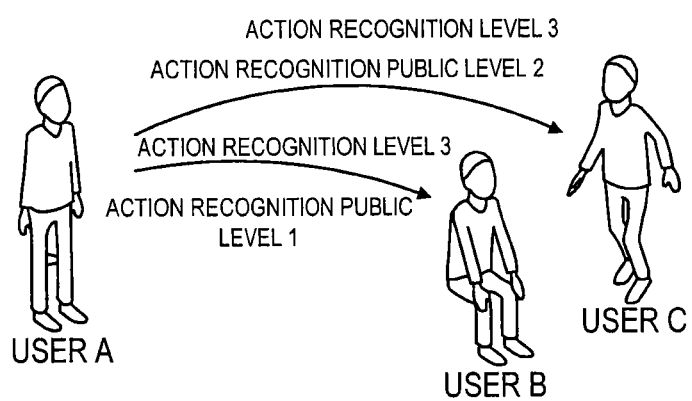
FIG. 41 is a schematic diagram illustrating an example of configuring an upper limit on the action recognition level that a user provides with respect to each recipient user, and linking with presence sharing technology.

FIG. 42 is a sequence diagram illustrating a process of the example of FIG. 41. First, after the user B starts to use the user terminal 500B in step S300, in step S302, the server 200 transmits an instruction to "share up to public level 3" to the user terminal 500A. Next, in step S304, information indicating that the user A "started walking" is transmitted to the server 200, and in step S306, the information is transmitted to the user terminal 500B. Next, in step S308, information indicating that the user A "sat down" is transmitted to the server 200, and in step S310, the information is transmitted to the user terminal 500B. In this way, the actions of the user A are shared between the user A and the user B.

Next, in step S312, information indicating that the user A "starting using phone" is transmitted to the server 200. The server 200 receives the information, and in step S314, transmits an instruction to "share up to public level 3" to the user terminal 500B. Consequently, the user terminal 500B configures the public level to 1.

Next, in step S316, information indicating that the user B "sat down" is transmitted to the server 200, and in step S318, the information is transmitted to the user terminal 500B. At this point, since information indicating that both the user A and the user B "sat down" has been obtained, the server 200 raises the public level to "2" on the basis of the correlation score, and transmits an instruction to "share up to public level 2" to both of the user terminals 500A and 500B (steps S320, S322).

Next, in step S324, information indicating that the user B is "sitting" in Chigasaki is transmitted to the server 200. In the next step S326, information indicating that the user A is "sitting" in Kamakura is transmitted to the server 200. In the next step S328, information indicating that the user B is "sitting" in Chigasaki is transmitted from the server 200 to the user terminal 500A. Next, in step S330, information indicating that the user A is "sitting" in Kamakura is transmitted from the server 200 to the user terminal 500B. At this point, since information indicating that both the user A and the user B are respectively "sitting" in Kamakura and Chigasaki, which are a comparatively short distance away, the correlation score computed by the server 200 rises higher. For this reason, the server 200 raises the public level to "1" on the basis of the correlation score, and transmits an instruction to "share up to public level 1" to both of the user terminals 500A and 500B (steps S332, S334).

After that, in step S336, information indicating that the user B is sitting and dining in Chigasaki is transmitted to the server 200. In the next step S338, information indicating that the user A is sitting and shopping in Kamakura is transmitted to the server 200. In the next step S340, information indicating that the user B is sitting and dining in Chigasaki is transmitted from the server 200 to the user terminal 500A. Next, in step S342, information indicating that the user A is sitting and shopping in Kamakura is transmitted from the server 200 to the user terminal 500B.

As above, according to the process in FIG. 42, it becomes possible to dynamically change the sharing level on the basis of the correlation between the actions of the user A and the user B. Consequently, each user is becomes able to know details about the actions of other users with highly correlated actions.

Furthermore, by changing the sharing level together with the action recognition level described in the first embodiment, it becomes possible to dynamically change the action recognition level on the basis of the correlation between the actions of the user A and the user B. Consequently, since the action recognition level of the action recognition units 506A, 506B, and so on may be changed on the basis of the correlation between the actions of the user A and the user B, the power consumption of each of the user terminals 500A and 500B may be reduced on the basis of the correlation. Consequently, since the action recognition level may be lowered as the correlation lowers, it is possible to decrease the power consumption of both of the user terminals 500A and 500B that are lowly correlated.

According to the second embodiment as described above, on the basis of the correlation between the actions of users, it becomes possible for highly correlated users to exchange more detailed information with each other.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing device including:

a receiving unit that receives predetermined information from a first information terminal possessed by a first user and a second information terminal possessed by a second user;

an action recognition unit that recognizes an action of the first user on the basis of the predetermined information received from the first information terminal; and an information transmitting unit that transmits, on the basis of the recognized action of the first user, information for determining whether or not the second information terminal possessed by the second user is to acquire the predetermined information.

(2)

The information processing device according to (1), further including:

an action recognition information transmitting unit that transmits the recognized action of the first user to the second information terminal.

(3)

The information processing device according to (2), wherein the action recognition information transmitting unit transmits the action of the first user to another information terminal that belongs to the same predetermined group as the first information terminal.

(4)

The information processing device according to (2), wherein the action recognition information transmitting unit transmits information related to a recognized action of one user to an information terminal of another user according to an action recognition level configured for each predetermined group.

(5)

The information processing device according to (2), wherein the action recognition information transmitting unit transmits a recognized action of the one user to the second information terminal according to an action recognition level that the first information terminal configures between itself and the second information terminal.

(6)

An information processing system including:

a client terminal that includes an acceleration sensor that acquires acceleration information, a position information acquisition unit that acquires position information, an operation information acquisition unit that acquires operation information, and an action recognition unit that recognizes an action of a user on the basis of the acceleration information, the position information, or the operation information; and a server that includes a receiving unit that receives action recognition result information recognized by the action recognition unit from the client terminal, and an information transmitting unit that transmits, on the basis of the action recognition result information, information for determining whether or not another client terminal possessed by another user is to acquire the acceleration information or the position information.

(7)

An information processing system including:

a client terminal that includes an acceleration sensor that acquires acceleration information, a position information acquisition unit that acquires position information, and an operation information acquisition unit that acquires operation information; and a server that includes a receiving unit that receives the acceleration information, the position information, or the operation information from the client terminal, an action recognition unit that recognizes an action of a user who possesses the client terminal on the basis of the acceleration information or the position information, and an information transmitting unit that transmits, on the basis of the recognized action of the user, information for determining whether or not another client terminal possessed by another user is to acquire the acceleration information or the position information.

(8)

A client terminal including:

an acceleration sensor that acquires acceleration information;

a position information acquisition unit that acquires position information;

an operation information acquisition unit that acquires operation information;

an action recognition unit that recognizes an action of a user on the basis of the acceleration information, the position information, or the operation information;

a transmitting unit that transmits action recognition result information recognized by the action recognition unit to a server; and a receiving unit that receives information transmitted by the server on the basis of the action recognition result information received from another client terminal, wherein the client terminal stops operation of the acceleration sensor or the position information acquisition unit on the basis of the information.

(9)

A client terminal including:

an acceleration sensor that acquires acceleration information;

a position information acquisition unit that acquires position information;

an operation information acquisition unit that acquires operation information;

a transmitting unit that transmits the acceleration information, the position information, or the operation information to a server; and a receiving unit that receives action recognition result information recognized by the server on the basis of the acceleration information or the position information received from another client terminal, wherein the client terminal stops operation of the acceleration sensor or the position information acquisition unit on the basis of the action recognition result information.

(10)

An information processing method including:

receiving predetermined information from a first information terminal possessed by a first user and a second information terminal possessed by a second user;

recognizing an action of the first user on the basis of the predetermined information received from the first information terminal; and transmitting, on the basis of the recognized action of the first user, information for determining whether or not the second information terminal possessed by the second user is to acquire the predetermined information.

(11)

A program causing a computer to function as:

means for receiving predetermined information from a first information terminal possessed by a first user and a second information terminal possessed by a second user;

means for recognizing an action of the first user on the basis of the predetermined information received from the first information terminal; and means for transmitting, on the basis of the recognized action of the first user, information for determining whether or not the second information terminal possessed by the second user is to acquire the predetermined information.

(12)

An information processing device including:

a receiving unit that receives predetermined information from a first information terminal possessed by a first user and a second information terminal possessed by a second user;

an action recognition unit that recognizes actions of the first and the second users on the basis of the predetermined information received from the first or the second information terminal;

a correlation score computation unit that computes a correlation score expressing a degree of correlation between the predetermined information received from the first information terminal and the predetermined information received from the second information terminal;

a selecting unit that selects, on the basis of the computed correlation score, an action to provide to the first user from among recognized actions of the second user; and a transmitting unit that transmits the selected action of the second user to the first information terminal.

(13)

The information processing device according to (12), wherein the selecting unit selects a more detailed action as the action to provide to the first user to the extent that the correlation score is high.

(14)

The information processing device according to (12), wherein the correlation score computation unit associates related information with each other between a plurality of information received from the first information terminal and information received from the second information terminal, computes, for each combination of related information, a correlation sub-score expressing a degree of correlation between the information, and computes the correlation score on the basis of, for each computed correlation sub-score, the correlation sub-score and a weighting coefficient that expresses a contribution of the sub-score to the correlation score.

(15)

The information processing device according to (14), wherein between the plurality of information received from the first information terminal and the information received from the second information terminal, information about a distance between the first and the second information terminals, attributes of locations where the first and the second information terminals are positioned, actions of the first and the second users, or a remaining time until a time that the first and the second users have configured is associated with each other.

(16)

The information processing device according to (12), wherein the correlation score computation unit includes a geo-categorizing unit for computing a correlation score by using correlations between geo-category histograms.

(17)

The information processing device according to (12), further including:

an action recognition level information transmitting unit that, on the basis of the correlation score, transmits to the first and the second information terminals information indicating a level at which the first and the second information terminals acquire the predetermined information.

(18)

The information processing device according to (12), further including:

a transmission frequency decision unit that decides a frequency at which to transmit the action pattern on the basis of the computed correlation score, wherein the transmitting unit transmits the selected action pattern of the second user to the first information terminal at the computed transmission frequency.

(19)

An information processing system including:

a first information terminal, possessed by a first user, that includes an acceleration sensor that acquires acceleration information, a position information acquisition unit that acquires position information, an operation information acquisition unit that acquires operation information, and an action recognition unit that recognizes an action of a user on the basis of the acceleration information, the position information, or the operation information;

a second information terminal, possessed by a second user, that includes an acceleration sensor that acquires acceleration information, a position information acquisition unit that acquires position information, and an action recognition unit that recognizes an action of a user on the basis of the acceleration information or the position information; and a server that includes a receiving unit that receives action recognition result information recognized by the action recognition unit from each of the first and the second information terminals, a correlation score computation unit that computes a correlation score expressing a degree of correlation between the action recognition result information received from the first information terminal and the action recognition result information received from the second information terminal, a selecting unit that selects, on the basis of the computed correlation score, an action to provide to the first user from among recognized actions of the second user, and a transmitting unit that transmits the selected action of the second user to the first information terminal.

(20)

An information processing system including:

a first information terminal, possessed by a first user, that includes an acceleration sensor that acquires acceleration information, a position information acquisition unit that acquires position information, and an operation information acquisition unit that acquires operation information;

a second information terminal, possessed by a second user, that includes an acceleration sensor that acquires acceleration information, a position information acquisition unit that acquires position information, and an operation information acquisition unit that acquires operation information; and a server that includes a receiving unit that receives the acceleration information, the position information, or the operation information from each of the first and the second information terminals, an action recognition unit that recognizes actions of the first and the second users who possess the first and the second information terminals on the basis of the acceleration information, the position information, or the operation information, a correlation score computation unit that computes a correlation score expressing a degree of correlation between action recognition result information obtained as a result of action recognition of the first user and action recognition result information obtained as a result of action recognition of the second user, a selecting unit that selects, on the basis of the computed correlation score, an action to provide to the first user from among recognized actions of the second user, and a transmitting unit that transmits the selected action of the second user to the first information terminal.

(21)

A client terminal including:

an acceleration sensor that acquires acceleration information;

a position information acquisition unit that acquires position information;

an operation information acquisition unit that acquires operation information;

an action recognition unit that recognizes an action of a user on the basis of the acceleration information, the position information, or the operation information;

a transmitting unit that transmits action recognition result information recognized by the action recognition unit to a server; and a receiving unit that receives an action of another client terminal selected by the server on the basis of a correlation score between the action recognition result information and action recognition result information acquired from the other client terminal.

(22)

A client terminal including:

an acceleration sensor that acquires acceleration information;

a position information acquisition unit that acquires position information;

an operation information acquisition unit that acquires operation information;

a transmitting unit that transmits the acceleration information, the position information, or the operation information to a server; and a receiving unit that receives an action of another client terminal selected by the server on the basis of a correlation score between an action of a user recognized on the basis of the acceleration information or the position information, and an action of a user of the other client terminal recognized on the basis of the acceleration information or the position information received from the other client terminal.

(23)
An information processing method including:
receiving predetermined information from a first information terminal possessed by a first user and a second information terminal possessed by a second user;
recognizing actions of the first and the second users on the basis of the predetermined information received from the first or the second information terminal;
computing a correlation score expressing a degree of correlation between the predetermined information received from the first information terminal and the predetermined information received from the second information terminal;
selecting, on the basis of the computed correlation score, an action to provide to the first user from among recognized actions of the second user; and
transmitting the selected action of the second user to the first information terminal.

(24)
A program causing a computer to function as:
means for receiving predetermined information from a first information terminal possessed by a first user and a second information terminal possessed by a second user;
means for recognizing actions of the first and the second users on the basis of the predetermined information received from the first or the second information terminal;
means for computing a correlation score expressing a degree of correlation between the predetermined information received from the first information terminal and the predetermined information received from the second information terminal;
means for selecting, on the basis of the computed correlation score, an action to provide to the first user from among recognized actions of the second user; and
means for transmitting the selected action of the second user to the first information terminal.

REFERENCE SIGNS LIST 100 server
102 receiving unit
104 action recognition unit
105 action recognition level information transmitting unit
106 action recognition information transmitting unit
200 server
202 receiving unit
204 action recognition unit
208 correlation score computation unit
210 selecting unit
208a geo-categorizing unit
220 action recognition level information transmitting unit
214 transmission frequency decision unit
500A, 500B user terminal

The invention claimed is:
1. An information processing device comprising circuitry configured to:
receive, via a processor coupled to receiving circuitry, a first action pattern determined from predetermined first action information from a first information terminal possessed by a first user;
the first action pattern determined by the first information terminal having action recognition circuitry including a processor coupled to an acceleration sensor, a gyro sensor, and Wi-Fi or GPS circuitry;
receive a second action pattern determined from predetermined second action information from a second information terminal possessed by a second user;
the second action information determined by the second information terminal having action recognition circuitry including a processor coupled to an acceleration sensor, a gyro sensor, and Wi-Fi or GPS circuitry;
wherein the first and second information terminal each include action pattern recognition circuitry configured to associate the action information with the position information to determine the associated first and second action pattern to each be one of: shopping, working, on a train, or dining;
receive predetermined first audio-visual information from the first information terminal possessed by the first user;
receive predetermined second audio-visual information from the second information terminal possessed by the second user;
determine a correlation level with respect to the first user and the second user, based upon the similarity of received first and second action pattern;
wherein the determined correlation level is set in accordance with a similarity value set in a predetermined table association of the first action pattern based upon the first action information and the first position information in relation to the second action pattern based upon the second action information and the second position information;
determining the correlation level based upon the similarity value, the correlation level being a level amongst a plurality of levels having a relation of being either high or low with respect to its numbering system;
when the determined level of correlation is low, permit sharing of the audio-visual information of the first user, which is associated to a low correlation level with the second terminal, and
when the computed level of correlation is high, permit sharing of the audio-visual information of the first user, which is associated to a high correlation level with the second terminal;
wherein by the sharing the associated level audio-visual information, the first terminal reduces unpermitted transmissions by avoiding an action that would have otherwise been made that requires a transmission to the second terminal when the low correlation level exists between the first terminal and second terminal thereby reducing power consumption at the first terminal, and the second terminal reduces reception of unpermitted communications thereby reducing power consumption at the second terminal;
based upon the determined correlation level, cause a display of the second terminal to display audio-visual action information of the first user being one of: generally engaged in listening to music, listening to a particular artist, listening to a particular song, or sharing the particular song; and
update the display based upon the determined correlation level;
wherein sharing the particular song is associated with the highest correlation level.

2. The information processing device according to claim 1,
wherein the first action information includes any of: operating, wearing, charging, other; and
wherein the second action information includes any of: operating, wearing, charging, other.

3. The information processing device according to claim 1,
wherein the first action information includes any of: walking, sitting, standing still, jumping, riding a train, riding a bus, riding a car; and
wherein the second action information includes any of: walking, sitting, standing still, jumping, riding a train, riding a bus, riding a car.

4. The information processing device according to claim 1,
wherein the first action information includes any of: shopping, riding a vehicle, dining, working; and
wherein the second action information includes any of: shopping, riding a vehicle, dining, working.

5. The information processing device according to claim 1, wherein the circuitry is further configured to
determine the correlation level by using a relationship score indication from the first terminal with respect to sharing information with the second terminal.

6. The information processing device according to claim 1, wherein the circuitry is further configured to
determine the correlation level by computing an individual score relation by computing any of: geographical distance sub-score, correlation between location attributes, correlation between action patterns, remaining time until mutually configured event, degree of closeness, and assigning a level association to the individual score.

7. The information processing device according to claim 1, wherein the circuitry is further configured to
determine the correlation level by computing an individual score relation by computing each of: geographical distance sub-score, correlation between location attributes, correlation between action patterns, remaining time until mutually configured event, degree of closeness, and assigning a level association to the individual score; along with an associated weight; and
combining the weighted sub-scores.

8. The information processing device according to claim 1, wherein the circuitry is further configured to:
when the computed level of correlation is high, permit sharing of the audio-visual information of the first user which is associated to the high correlation level with the second terminal, determine a frequency at which to the audio-visual information of the first user.

9. A client terminal comprising circuitry configured to:
acquire acceleration information;
acquire position information;
acquire operation information;
recognize action information of a user in possession of the client terminal on the basis of the acceleration information, the position information, or the operation information;
determine a first action pattern associating the action information with the position information to determine the first action pattern to be one of: shopping, working, on a train, or dining;
transmit the first action pattern to a server;
transmit audio-visual information to the server;
receive a signal indicating a server determined correlation level, with respect to the user and a second user, which was based upon determining a similarity of the first transmitted action pattern and a second transmitted action pattern received at the server from a second client device of which the second user was in possession;
wherein the determined correlation level is set in accordance with a similarity value set in a predetermined table association of a first action pattern based upon the first action information and the first position information in relation to the second action pattern based upon the second action information and the second position information;
wherein the correlation level being a level amongst a plurality of levels having a relation of being either high or low with respect to its numbering system;
when the determined level of correlation is low, send the corresponding audio-visual information of the first user to the server, and when the computed level of correlation is high, send the corresponding audio-visual information of the first user to the server;
wherein by sending the corresponding audio-visual information, the first terminal reduces unpermitted transmissions by avoiding an action that would have otherwise been made that requires a transmission to the second terminal when the low correlation level exists between the first terminal and second terminal thereby reducing power consumption;
wherein the audio-visual action information of the first user is one of: generally engaged in listening to music, listening to a particular artist, listening to a particular song, or sharing the particular song;
wherein sharing the particular song is associated with the highest correlation level.

10. A client terminal comprising circuitry configured to:
acquire acceleration information;
acquire position information;
acquire operation information;
recognize action information of a user in possession of the client terminal on the basis of the acceleration information, the position information, or the operation information;
determine a first action pattern associating the action information with the position information to determine the first action pattern to be one of: shopping, working, on a train, or dining;
transmit the first action pattern to a server;
transmit audio-visual information to the server;
receive a signal indicating a server determined correlation level, with respect to the user and a second user, which was based upon determining a similarity of the first transmitted action pattern and a second transmitted action pattern received at the server from a second client device of which the second user was in possession;
wherein the determined correlation level is set in accordance with a similarity value set in a predetermined table association of a first action pattern based upon the first action information and the first position information in relation to the second action pattern based upon the second action information and the second position information;
wherein the correlation level being a level amongst a plurality of levels having a relation of being either high or low with respect to its numbering system;
when the determined level of correlation is low the server does not let the client terminal receive the audio-visual information of the first user from the server, and when the determined level of correlation is high the server does let the client terminal receive the audio-visual information of the first user from the server;
wherein by not permitting the client terminal to receive the audio-visual information when the correlation level is low, the client terminal reduces unpermitted receptions transmissions by avoiding an action that would have otherwise been made that requires a reception by the client terminal from the server when the correlation level is low thereby reducing power consumption;
wherein the audio-visual action information of the first user is one of: generally engaged in listening to music, listening to a particular artist, listening to a particular song, or sharing the particular song; and
displaying the received audio-visual information in accordance with the determined correlation level.

* * * * *